(12) United States Patent
Bunte et al.

(10) Patent No.: US 6,249,008 B1
(45) Date of Patent: Jun. 19, 2001

(54) CODE READER HAVING REPLACEABLE OPTICS ASSEMBLIES SUPPORTING MULTIPLE ILLUMINATORS

(75) Inventors: Alan G. Bunte, Cedar Rapids; Arvin D. Danielson, Solon, both of IA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/519,154

(22) Filed: Mar. 6, 2000

Related U.S. Application Data

(63) Continuation of application No. 08/807,653, filed on Feb. 27, 1997, now Pat. No. 6,034,379.
(60) Provisional application No. 60/012,657, filed on Mar. 1, 1996.

(51) Int. Cl.[7] .................................................. G06K 7/10
(52) U.S. Cl. ............................................ 250/566; 250/205
(58) Field of Search ................................... 250/566, 205, 250/208.1, 216; 235/455, 437, 462.01, 462.07, 462.11, 462.46, 472.01, 472.03; 382/313

(56) References Cited

U.S. PATENT DOCUMENTS 5,701,001 * 12/1997 Sugifune et al. .................... 235/472

* cited by examiner

*Primary Examiner*—Que T. Le
(74) *Attorney, Agent, or Firm*—Akin, Gump, Stauss, Hauer & Feld, L.L.P.

(57) ABSTRACT

A code reader configured with a plurality of types of illuminators is disclosed. Having access to the plurality of illuminator types, the code reader controls a reading attempt by first selecting and using one of the available illuminators. If the use of that illuminator fails to yield a valid read, the code reader selects a second of the available illuminators and reattempts the read. Again, upon failure to obtain a valid read, the coder reader selects yet another illuminator and so on until a valid read is obtained else all illuminator options have been exhausted. Illuminator selection order is set as a factory default, but adapts based on actual performance in a users environment. Alternately, illuminator order selection is based on range from the target. Such range may be proximity based, or based on marker beam distance calculations. Additionally, the illuminators are mounted on a single assembly along with read control program memory for ease in upgrade replacement. The illuminators share one or more detectors in performing read operations.

17 Claims, 21 Drawing Sheets

CODE READER HAVING REPLACEABLE OPTICS ASSEMBLIES SUPPORTING MULTIPLE ILLUMINATORS

CROSS-REFERENCE TO RELATED APPLICATIONS

The present application is a continuation of application Ser. No. 08/807,653 filed Feb. 27, 1997, U.S. Pat. No. 6,034,379, which claims priority pursuant to 35 U.S.C. Sec. 119(e) to U.S. Provisional Application Ser. No. 60/012,657), filed Mar. 1, 1996, which is hereby incorporated herein by reference in its entirety.

BACKGROUND OF THE INVENTION

1. Field of the Invention

The invention relates generally to code readers and particularly to readers which sense optically discernible symbol combinations or codes, such as bar codes and two-dimensional codes.

2. Discussion of the Related Art

A variety of types of illuminators and corresponding photosensors can be found in conventional code readers. Some read 1-D or 2-D codes through use of a phototransistor to sense reflections of laser diode light as it is scanned across a target code. Others employ 1-D and 2-D photodetector arrays to sense reflections from flash type illuminators or LED (light emitting diode) array.

Such varieties exist because not all types of illuminator and photosensor combinations perform the same. For example, some combinations: 1) exhibit reading ability over longer distances; 2) more easily recognize damaged codes; 3) read only 1-D type codes; 4) consume relatively more power; 5) require a greater footprint; 6) also capture non-code images; and 7) cost relatively less than other types of combinations.

Because of such variations in performance, to choose an appropriate type of code reader (i.e., to choose an appropriate illuminator and photosensor combination), the requirements of a given application must be examined. Requirements such as short range, portability, 1-D code reading only and low cost might result, for example, in the selection of a CCD type reader employing a photodiode array as the illuminator. Similarly, by also requiring long range performance might result in the selection of a scanning laser diode configuration. Therefore, for optimal performance, a user must purchase a conventional code reader which economically and reliably meets the requirements of the task at hand.

After appropriately selecting and purchasing a given code reader, however, many factors arise which cause the user to become dissatisfied with the reader. Such factors include, for example, changes in the requirements of the task at hand, changes in characteristics of current code reader types and developments of new types of code readers with entirely different operating characteristics. As a result, the user may be forced to purchase another code reader.

Moreover, in many circumstances, a single code reader cannot satisfactorily meet all of the requirements of the task at hand. In such situations, the best conventional code reader may only perform with marginal reading success, or only read certain types of codes. If multiple code reader types are not employed in such circumstances, the user must accept such undesirable limitations in performance. Further, when a code reader exhibits marginal success, users are much more likely to engage in a series of failed read attempts, wasting both energy (a significant factor in portable configurations) and user efficiency.

Thus, there is a need for a code reader which is capable of solving all of the foregoing problems. In particular, it is an object of the present invention to provide a code reader which exhibits or can be adapted to exhibit the characteristics of the various types of conventional code readers.

SUMMARY OF THE INVENTION

An improved apparatus and method is provided for a code reader for reading optical indicia on a target surface, having a first and second type of illuminator and a processor which selects the first type of illuminator to conduct first read attempts and selects the second type to conduct second read attempts when first read attempts fail. The processor may be also be-configured to change the read selection ordering, i.e., to choose said second type of illuminator to conduct first read attempts and said first type of illuminator to conduct second read attempts, if actual read performance in a given environment so justifies.

In some configurations, the code reader also comprises a first type of detector for receiving light originating at said first type of illuminator, and a second type of detector for receiving light originating at said second type of illuminator. In other configurations, a single detector is provided which receives light originating at either said first and second types of illuminators.

In another embodiment of the present invention, the processor selects the first type of illuminator to conduct read attempts for optical indicia located within the first range, and selects the second type of illuminator to conduct read attempts for optical indicia located within the second range. Range is determined using marker beam(s) or any proximity detector.

Another further aspect of the present invention involves the use of replaceable (upgradeable) illuminator assemblies, each of which contains one or more types of illuminators thereon. Instead of requiring the purchase of a new code reader, a user may merely purchase a new illuminator assembly. To accommodate this feature, a connector is provided within the code reader which receives any one of a plurality of types of illuminator assemblies, and communicatively couples a received assembly to a control processing circuit. In one application, the connector receives PCM-CIA type illuminator assemblies.

The illuminator assemblies may also contain program memory which stores instructions relating to read processing. Thus, by merely installing an illuminator assembly, appropriate read processing can be carried out.

Other principal objects, features and advantages of the invention will become apparent from the following description taken in connection with the accompanying drawings, wherein are set forth, by way of illustration and example, certain embodiments and features of this invention.

BRIEF DESCRIPTION OF THE DRAWINGS

FIG. 18b is a schematic block diagram illustrating one embodiment of the present invention which provides further detail regarding assemblies identified in FIG. 18a.

FIG. 20a illustrates a main circuit board comprising much of the control elements in FIG. 18a. FIG. 20b illustrates replacement of illuminator and sensor assemblies. FIG. 20c illustrates a single assembly for both illuminator and sensor mounting.

FIG. 21a illustrates an illuminator assembly having both a flash illuminator and a laser diode. FIG. 21b illustrates an assembly containing both a laser diode and a diffused LED array. FIG. 21c illustrates an assembly comprising a flash illuminator and a diffused LED array. FIG. 21d illustrates three types of illuminators in a single assembly.

FIG. 24b illustrates a tablet-based code reader having a microprocessor and a DSP on a mother board. FIG. 24c illustrates another configuration of the tablet-based code reader of FIG. 24b. FIG. 24d illustrates another configuration of the code reader of FIGS. 24b–c.

DETAILED DESCRIPTION OF THE INVENTION

Figure 1:
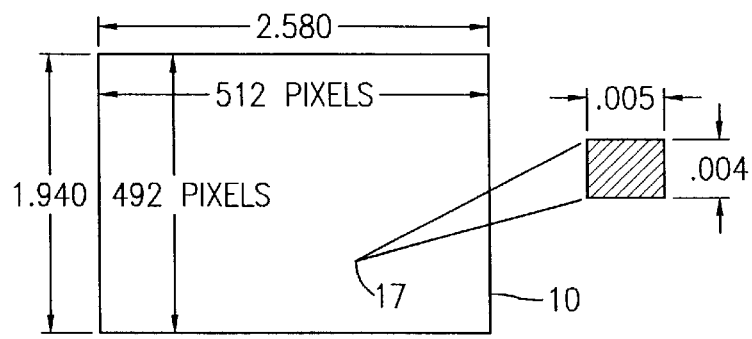
FIG. 1 is a diagram for illustrating the optical sensing area as is defined by a field of view of a lens system, such as from the use of a typical solid state video imaging array and a lens system with a magnification ratio of ten to one, in a hand-held optical reader in accordance with the present invention.

With respect to each of the embodiments disclosed herein, the following related disclosures are hereby incorporated by reference in their entireties, including the drawings thereof: PCT/US93/02139, filed Mar. 10, 1993; PCT/US92/06157, filed Jul. 23, 1992; PCT/US93/12459, filed Dec. 12, 1993; and PCT/US94/05380, filed May 11, 1994. These incorporated disclosures describe techniques for assisting in aiming by displaying the field of view of a code reader for observation by the operator during aiming, and for using ranging marker beams to assist in automatically setting the focus of an optical system. These techniques may be employed for displaying on a display, confronting the user, the location of one or more marker spots as described herein and a target code or bullseye, to assist in aiming without direct viewing of the marker spot or spots by the operator. Also, the marker spot or spots as described herein can provide range information to the area-type sensors as described herein to enable automatic focus adjustment. With the marker beams active as described herein, the sensor and processing system can detect when the focus setting is correct and when the bullseye or other feature of the code is appropriately located, and automatically trigger the actual reader operation (with marker beams off) including any needed level of flash illumination of the code region.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The biggest negatives surrounding the use of portable OCR systems have related to the inherent weaknesses of the available hand-held scanner technology. The purpose of the described invention is to substantially improve the performance and capabilities of hand-held OCR scanners so that this inherently convenient coding method can become a viable alternative for automatic identification applications.

The invention consequently seeks to eliminate the need for accurately spacing the reader substantially perpendicularly to the codes being read. An OCR device in accordance with the invention would therefore desirably include a provision for instantaneously illuminating a region exterior to the reader, which region contains the combination of codes or characters to be read. Thus, during a single instance of illumination, the selective reflection representing relatively darker and lighter elements of the code configuration to be read may be imaged or focused with suitable optics at an interior region within the reader, the interior region being referred to also as an imaging area.

An array of photosensor elements is disposed at the interior imaging area. The photosensor elements receive during that instant of illumination from any information at the exterior region a complete light image or optical image at the interior region. The instantaneous transfer of the image to the imaging area substantially eliminates risk of error due to an operator causing an inadvertent movement of the reader. A possible source of error in aiming was recognized, however. Such source of error may be minimized, if not totally eliminated, when an operator can obliquely scan the coded information in a manner whereby the reader does not interfere with the operator's view of the coded information and whereby any rectilinear distortion of the generated image arising from the oblique scanning can be automatically and electronically corrected. In accordance with the invention, it is, consequently, contemplated to identify or mark the region from which optical information would be transferred to the area array of photosensor elements or photosensor array and to automatically and electrically correct for any rectilinear distortion arising from such oblique scanning.

As a specific example, marker beams originating from light sources at the four corners of the photosensor array may be projected via suitable optics onto a supporting surface carrying the information, such as a label, to be read. The beam of the light sources may be shaped optically, such as by non-spherical lenses associated with the light sources to linearize the marker spots impinging the surface containing the information. In the case of a marker beam of elongate, linearized cross section, the light sources need not be located at the corners of the photosensor array, though conveniently the optics for projecting and focusing the image of information onto the photosensor array may be used. The marker beams bracket the optical field of view of the photosensor array, desirably in alignment with the periphery thereof. Consequently any information, such as contained on bar code or two-dimensional coded labels,, within the region bounded by the marker beams, is necessarily projected or focused onto the photosensor array.

Once the image is focused on the photosensor array, the output of each photosensor element may be electrically read and stored in accordance with data processing techniques. However, it needs to be pointed out that the recorded or stored image is a "raw image", as it was received during the instance of illumination. The image may contain an image of dirt spots which may have adhered to portions of a bar code, for example.

One advantage of the OCR device over traditional scanner units is that an entire area of the code has been recorded or stored. A scanner typically operates to read a line or section through a bar code, for example. A number of repeat readings may be employed to achieve an average reading. However, with a more complex unit providing for such repeated scanning operations, any movement during these repeat readings would tend to dilute the accuracy of any of the readings. Hence, with an OCR device the image representing the entire information becomes fixed instantaneously with electronics of the reader. Subsequently any number of readings may be taken and verified from the fixed or stored information. Also, any data manipulation may be performed in accordance with known data processing techniques to transform the stored image to a clearly recognizable data code.

Another advantage is being realized with respect to recently developing trends in the code marking art. With increasing understanding of data processing techniques for inventory handling and merchandising operations in general, a need has emerged to pack more information into each single code combination or code cluster. Recent developments suggest replacing conventional single line bar codes with multi-line bar code patterns having a more densely packed configuration. Codes having these new configurations are generally known as "stacked bar codes." Simply stated, stacked bar codes are compressed in the direction perpendicular to the reading direction and are arranged in a multi-line stacked configuration, like a page of printed material. A number of differing standards for bar codes exist, two of which are known as "Code 49" and "16K". Code 49 may consist of stacked lines or rows of code indicia two to eight rows high, while the 16K code may use stacked rows of code indicia between two and sixteen rows high.

It is understandable that with conventional code scanners, reading scanned codes at angles other than perfect alignment with the linear arrangement of the codes may present code recognition problems. Of course, if less than the entire code information is recognized, the entire code is typically indicated as not having been read, so that a re-read cycle must be initiated. Since valuable time may be lost by repeating reading operations, it is of course desirable to recognize the code. Since a code may also not have been recognized because of a lateral shift of the active area of the scanner away from the label configuration, either the angular misalignment or a lateral shift may be a cause for non-recognition of the code.

It is apparent that the current invention is particularly advantageous for reading the described "stacked bar codes" as well as other two-dimensional information. The referred-to marker beams are able to indicate or show when the entire code pattern is within the region from which an image of the code pattern can be transferred to the photosensor array. Hence, a major source of error is eliminated. Secondly, the instantaneous focusing of the information on the photosensor array reduces the risk of error caused by inadvertent movement of the reader during a prolonged process. Thirdly, since typical data processing techniques permit the code to be aligned electronically after it has become stored in the reader, critical alignment requirements are no longer needed for information to be read from the stored code image. Fourth, one or more of the marker beams may be directed to converge toward an optical axis of the OCR device, thereby providing an operator with information as to whether the OCR device should be moved toward or away from the surface containing the code pattern. Fifth, a greater line density of photosensors to compensate for corresponding foreshortening of the relative spacing in the generated image of off-baseline elements of the coded information as herein provided, to provide substantially distortion-free, obliquely scanned images.

Initial processing of the image is a normalization process which sometimes also may be referred to as "calibration" during which the orientation of the image may be recognized, during which distortion arising from oblique scanning may be recognized, and during which blemishes, such as dirt spots, may be recognized and image electronically reoriented and blemishes neutralized in accordance with known data processing techniques. The stored image may then be read by the reader and the information may be transferred to desired electronic data banks.

In FIG. 1 an optical sensing area is delineated which represents the result of the use of a typical solid state video imaging array with a lens system that provides a magnification ratio of ten to one. The resultant active area is 2.58 inches×1.94 inches as indicated.

Figure 2:
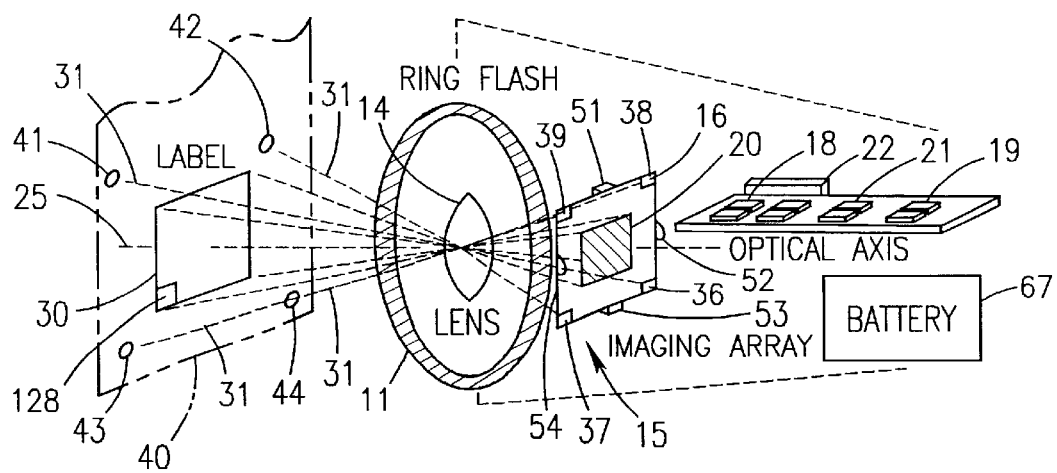
FIG. 2 is a diagrammatic illustration of a preferred form of a hand-held optical reader in accordance with the present invention, arranged so as to have its optical sensing area or field of view completely encompassing the machine-readable code (e.g. bar code) or human-readable information (e.g. line or lines of text) on a label so that a complete instantaneous optical image thereof is projected onto an area array of photosensors within the reader and may be converted by the reader into digital image data and stored in a processor memory of the reader and diagrammatically showing a range finger and motion sensing and control mechanism thereof.

FIG. 2 shows a diagrammatic view of an optical system that incorporates the components described. The ring flash is a preferred light source for its ability to provide relatively uniform illumination with minimum back scatter into the imaging device. Also, it may be "wrapped" around the lens, as shown, providing a compact, efficient package. The imaging array may be placed directly in line with the optical axis of the reader, so that the optical portion of a hand-held reader can be quite compact Operation of the reader consists of the user "aiming" at the target label and activating a switch to initiate the read. The flashtube is effective to provide an essentially instantaneous illumination, so movement of the hand-held reader during this time is noncritical. The digital processor immediately begins clocking the imaging array to read its contents which correspond to the intensity of the light from the active sensing area that was focused on the imaging array The actual output of the imaging array is normally an analog signal. Since only white or dark information is needed, the conversion decision may consist of a comparator circuit with appropriately selected bandwidth and hysteresis to correspond to the characteristics of the imaging circuit output.

The digital information is assembled into a manageable format, such as sixteen bit data words corresponding to the word length of the digital processor and stored directly into the processor memory array. For example, an entire image may consist of 492 lines of 512 samples each for a total 251,904 bits or 31,488 bytes of information, as illustrated in FIG. 1. Once the image acquisition process is complete, the digital processor may then begin operating on the image information to remove blemish and noise components, rotate the image to a normalized position, correct for optical skew due to curvature of the target label or reading from an off-axis angle as described herein, and the like, to optimize the pattern recognition process. An important feature of the described system is the ability of the digital processor to detect during such discussed normalization the locations of blemishes or flaws in the image sensing array and to store those locations in a non-volatile memory so that flawed image data may be masked or compensated to remove such errors from consideration in the recognition algorithms.

When image normalization is complete, the recognition process may then be initiated. The first level of recognition is to determine whether the coded information is a bar code or a line of characters or two-dimensional coded information, for example. If a bar code is recognized, standard bar code decode algorithms may be employed; if a character format is recognized, a character recognition algorithm is invoked; etc.

The digital processor employed for the image normalization, processing and recognition functions must be extremely fast and efficient for acceptable user satisfaction. A processor, such as a Texas Instruments TMS320C25 type which is designed for digital signal processing applications and has extremely fast execution speeds while operating with acceptable power consumption levels for a portable hand-held unit, is used to address external program and data memory, perform bit and word manipulations.

Referring first generally to FIG. 2, there is illustrated somewhat schematically a hand-held area-type optical reader. The reader is also sometimes referred to as an improved Optical Character Reader ("OCR") device. The reader, as will be explained, is capable of reading all the characters, bar codes or other information at an optical sensing area such as indicated at 10 in FIG. 1, essentially instantaneously. The area 10 to be read may be illuminated by light from a ring-type illuminator 11, preferably a xenon flash tube. The reader shown schematically as a hand-held scanner unit 12, indicated by dash lines, may house the light source 11, and suitable optics, such as a lens 14. The optics 14 include a focal plane at an interior region 15 of the scanner unit or reader 12.

A solid-state area-type photosensor array, such as indicated at 16, is disposed in the focal plane defined by the interior region 15. The photosensor array 16 is comprised of a plurality of photosensor elements arranged in an area corresponding in the sensing area 10 externally of the reader 12 to respective pixels, such as at 17, FIG. 1. The individual photosensor elements or pixels in the area array of photosensor elements or photosensor array 16 may have a density, such as in typical video cameras. Thus, the sensing area 10, as an external projection of the photosensor array 16, is enlarged with respect to the photosensor array 16 in accordance with a magnification ratio, such as ten to one, of optics of such video cameras. However, even with such enlargement of the sensing area 10, the number of pixels 17 illustrated in FIG. 1 provide a resolution of individual pixel of 0.004 inch by 0.005 inch (four mils high by five mils wide).

Figure 4:
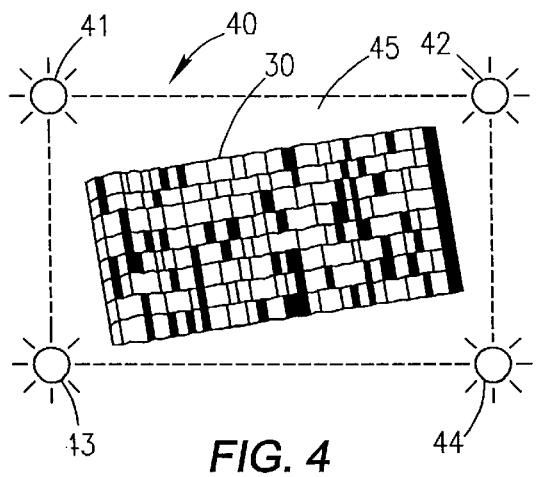
FIG. 4 is an illustration of a stacked bar code and of one of the manners in which a field of view of the optical reader is indicated to a user to facilitate alignment of the field of view with a label bearing indicia such as the stacked bar code.
Figure 5:
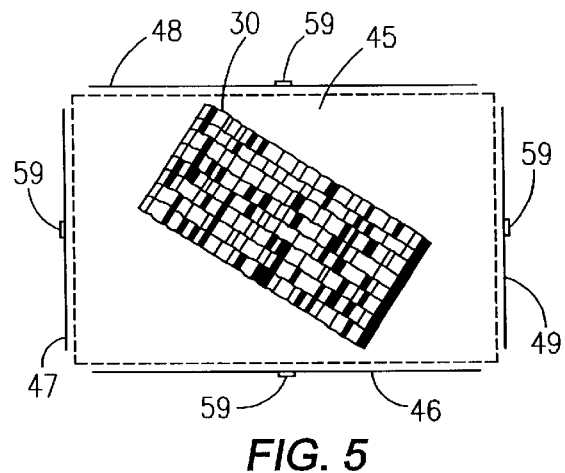
FIG. 5 is an illustration of an alternate manner for indicating to a user of the optical reader the field of view of the information gathering elements in accordance with the invention.
Figure 6:
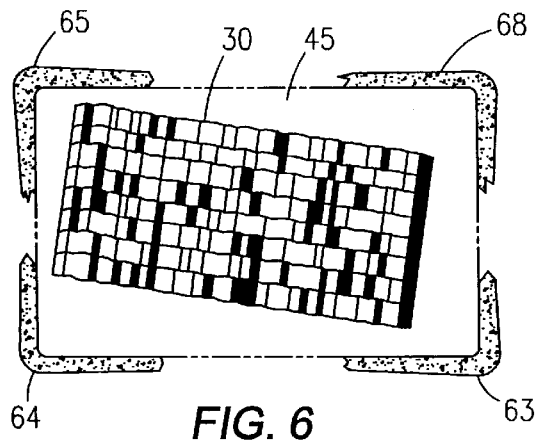
FIG. 6 is an illustration of yet another manner for indicating the field of view of the optical reader.

Once the flash energization of the light source 11 is complete, the photosensor array 16 may be read out, each line of photosensor elements of the array being shifted out serially for example, and the respective lines of photosensor elements being read out in parallel for example to an analog/logic interface component 18 within the hand-held scanner unit 12. A signal processor 19, such as the referred to Texas Instruments TMS320C25 signal processor type, disposed in the scanner unit 12 and connected with the analog/logic interface component 18, may receive from the focussed information image, e.g., at 20, FIG. 2, the area image data and supply the raw area image data to an associated memory 21 in the hand-held scanner unit 12 for subsequent processing in the hand-held unit. As an alternative, the raw area image data (e.g., in digital form) may be coupled via an RF or optical link 22 to a host processor (not indicated) for storage and processing. Such a separate host processor may also be portable and carried by the user.

Where the focussed information image 20, such as that of a bar code or stacked bar code as shown in FIGS. 4 through 6, on the photosensor array 16 is tilted relative to the longitudinal (widthwise) axis of the array 16, the raw image data as stored in digital form may be subsequently processed so as to be rotated into a normal horizontal disposition prior to decoding thereof by well known algorithms.

In reference to FIG. 2, the flash tube 11 and the lens 14 may have circular symmetry relative to their common longitudinal axis 25 which is consequently also the optical axis of the reader 12. Hence the illuminator or flash tube 11 is disposed annularly about the optics represented by the lens 14, so that any angle of tilt of label 30 about axis 25 is not detrimental to uniform optical imaging of the entire information field of the label 30.

Marker beams 31 originating from light sources 36, 37, 38 and 39 at the four corners of area photosensor array 16 may be projected onto a supporting surface 40 carrying label 30, via optics 14, to produce visually discernible indicia, such as marker spots 41, 42, 43 and 44, respectively, so that array 16 may be readily aligned relative to area information, e.g., on label 30, as the hand-held unit 12 is being moved into proximity thereto.

By way of example, the light sources 36–39 may be light emitting diodes at the four corners of the photosensor array 16, which light emitting diodes may be sequentially pulsed so that the marker spots 41–44 are each produced at a repetition rate of sixty per second when the hand-held scanner unit is placed in a target seeking mode. Once the four marker spots "bracket" the information to be read, as indicated in FIGS. 2 and 4 through 6, regardless of tilt, or regardless of whether the information extends horizontally or vertically, the light source 11 may be triggered, marker spots 41–44 being extinguished by this time, or the wavelength thereof being prevented from affecting the photosensor array by filtering for example.

As long as the marker spots 41 through 44 bracket the information to be read, e.g., information on the label 30, the image 20 of the entire information field is necessarily focussed on the active or photosensitive area of the photosensor array 16. It should be understood that only the information and not the entire label 30 needs to become located within an area 45 of the supporting surface 40 bounded by the marker spots 41 through 44. FIG. 4 shows a stacked bar code label 30 disposed within the area 45 bracketed by the marker spots 41 through 44. Hence the image of the information represented by the stacked bars of the label 30 is projected onto and becomes focussed on the active area of the photosensor array 16. Though the information is captured within the area 45 at an angle, the image 20 will still be focussed on the photosensor array 16. Hence the entire image 20 with all information bearing dark and light configuration combinations of the code can be read into memory locations of the memory 21.

One manner in which the marker spots 41 through 44 define the area 45, such as described with respect to FIG. 2, is also illustrated in FIG. 4. The area 45 as indicated by dashed lines is bracketed at its corners by the marker spots 41 through 44. Thus, to line up indicia to be read, such as the stacked bar code label 30, an operator would aim the marker spots 41 through 44 so that information on the label does not extend to or beyond a straight line between two adjacent ones of the marker spots.

FIG. 5 illustrates another manner of delineating the area 45. In lieu of the marker spots 41 through 44, FIG. 5 shows linear illumination bars 46, 47, 48 and 49 which closely bound the area 45, as depicted again by the dashed lines. It may be preferred to mark the area 45 by a linear illumination outline comprised of the illumination bars 46 through 49 in that the photosensor array may be allowed to contain an uninterrupted matrix without the need to preserve corner locations thereof for the light emitting diode as described with respect to FIG. 4.

Briefly referring back to FIG. 2, the illumination spots or bars 46 through 49 may be produced by light sources, such as light emitting diodes or laser diodes in combination with linear lenses, which may be disposed in the focal plane 15 at midpoints of each of the edges of and directly adjacent the photosensor array 16, as indicated by the numerals 51, 52, 53 and 54 respectively. Thus, as with respect to the earlier described example, the optics 14 may be used to direct light beams resulting in the marker bars 46 through 49 through the optics 14 against the surface 40.

FIG. 5 shows the label 30 disposed at an increased angle with respect to the major outline of the area 45 and of a smaller size. Again, the criterion for focussing information on the active area of the photosensor array 16 is to aim the field of view of the reader 12 as identified to the user by the marker indicia, such as the described spots or bars, so as to place the information to be read entirely within the area 45. If the angular alignment of the label 30 is less than that illustrated in FIG. 4, and is disposed at an angle with respect to the illustrated-rectangular shape of the active field of view in FIG. 5, the user may simply back off the reader 12 away from the surface 40 until the entire information area of the label 30 is contained within the area 45.

An increased distance between the label 30 and the reader 12 results in a smaller image of information being focussed on the photosensor array 16. However, as the label 30 shown in FIG. 4, the entire label 30 in FIG. 5 will become focused on the photosensor array 16. The flash illumination by the referred to xenon flash tube 11 may be chosen to allow the "f-stop" of the optics 14 to be stopped down such that the depth of field of the reader is increased to allow the image 20 to become focused on the photosensor array 16 even though the distance between the reader 12 and the supporting surface 40 may vary for example, between two inches to well in excess of one foot. It may further be found convenient to use currently known and available automatic focusing techniques to further increase the ability of the reader to focus the image 20 over a yet further increased range of distances of several feet between the indicia to be read and the reader 12. Such increase in versatility of the reader 12 would result, of course, in a corresponding increase in the cost of the reader.

Figure 7:
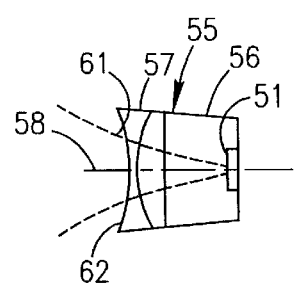
FIG. 7 shows a schematically simplified view of a light source and related linear optics for delineating the field of view of the optical reader as further described herein.

FIG. 7 illustrates a light source (such as shown at 51 through 54 in FIG. 2), say source 51, more generally identified as light source assembly 55, in combination with a typical molded casing 56 including a lens 57 for linearly expanding the light emitted from the source 51 in one or more directions away from its optical axis 58. Thus, as illustrated in FIG. 5, the light emitted, from the sources 51 through 54 is expanded linearly from center points shown at 59 into two directions disposed at a 180 degree angle.

It may also be possible to change the angle between the two legs 61 and 62 (FIG. 7) from 180 degrees to, for example, a right angle between the two directions of expansion of the emitted light. With such modification, the expansion direction 62 would be directed into the plane or out of the plane of the drawing of FIG. 7. The configuration of marker spots 63, 64, 65 and 66 in FIG. 6 illustrate a right angle expansion of the light emitted through correspondingly configured lenses 57. In the configuration of the marker spots 63 through 66, the corresponding light sources would be located again at the corners of the photosensor array 16, as shown with respect to the light sources 36 through 39, for example.

It would be expected that the intensity of the linearly deflected or expanded light decreases with the distance from the optical center of the non-deflected light beam. Thus, as shown in FIG. 5, the corners of the area delineated by the marker bars 46 through 49 may not be illuminated by the marker bars, while the centers of the sides of the area 45 shown in FIG. 6 may not be illuminated or only slightly illuminated relatively to more brightly illuminated corners by the respective marker spots 63 through 66. FIG. 6 also shows the label 30 disposed entirely within the area 45 delineated by the marker spots 63 through 66.

While FIGS. 4 through 6 show a somewhat rectangular configuration of the marker spots or bars, a square configuration with a correspondingly square configuration of the photosensor array 16 may be preferred. However, the particular shape of the photosensor array 16 and the marked or delineated area 45 are not critical, as long as the area 45 delineated by the marker spots defines the active area 20 disposed in the interior of the reader 12.

As described, a complete label, e.g., five inches high by five inches wide, having a complete bar code, or row or rows of characters thereon or other two-dimensional arrangement, can be focussed onto the operative area of a complete image photosensor array, such as 16, in response to a single essentially instantaneous flash of a light source, such as 11. A relatively larger sized label 30 would simply require an operator of the reader to increase the distance between the reader 12 and the label to be read.

In some applications, the height dimension of the complete image area array 16 may be such that a complete area information image including the entire area information width, e.g., of an eighty column line of characters, can be read whether the width of the information image is disposed widthwise or heightwise or diagonally on the photosensor array 16. In general, such area information is focusable on the photosensor array 16 in any angular orientation about the optical axis 25. By way of example, a label 30 containing all its information in an area of square configuration 1.3 inches on a side could be disposed so that its width extended horizontally or vertically or at an acute angle on the photosensor array 16 and in each case the entire contents of the label could be read with a single flash of light source 11.

Preferably the hand-held unit 12 contains batteries "BATTERY" (schematically indicated in FIG. 2 at 67) with sufficient energy so as to supply the flashable light source means 11 and the other components of the hand-held unit, so that the unit is essentially self-contained and free of any connecting cable or the like.

The system of FIG. 2 may be provided with an autofocus ranging system, as already referred to above, so that the reader 12 may have the ability to read at extended distances, e.g., up to forty-eight inches and possibly even greater distances, and may also be capable of reading a wider range of target areas. Autofocus systems are common in 35 mm cameras.

The hand-held scanner unit 12 of FIG. 2 may contain the programming to recognize several types of optically discernible indicia of information, such as bar codes as well as conventional character fonts and other two-dimensional information, and to automatically select the appropriate decoding algorithm from those available in its on-board stored program. Furthermore, the hand-held unit 12 may contain an area array photosensor 16 of size and resolution so as to register the above-mentioned multiple lines of characters, e.g., eight lines of eighty characters each at one time. Preferably, the entire information field to be scanned, or instantaneously to be recorded or read, such as represented by label 30 in FIG. 2, is illuminated simultaneously by a brief flash of highly intense light source such as the xenon tube 11.

The reading of bar codes with a complete area photosensor array such as 16, enables the digital data representing a bar code, for example, to be rotated and otherwise normalized as a complete entity prior to decoding, such that the normalized data may correspond to that obtained by sequentially scanning along a bar code parallel to the longitudinal bar code axis at a multiplicity of levels separated center to center, e.g., by four mils. By combining the corresponding data points at different levels, e.g., on an averaging basis, defects in the bar code image can be reliably overcome such as defects due to foreign matter, spurious marking and the like. Again, the bar code can be disposed at any random angle relative to the reader during the reading operation, speeding the reading of the labels, reducing operator fatigue and increasing the number of labels which can be read during a working day.

Figure 3:
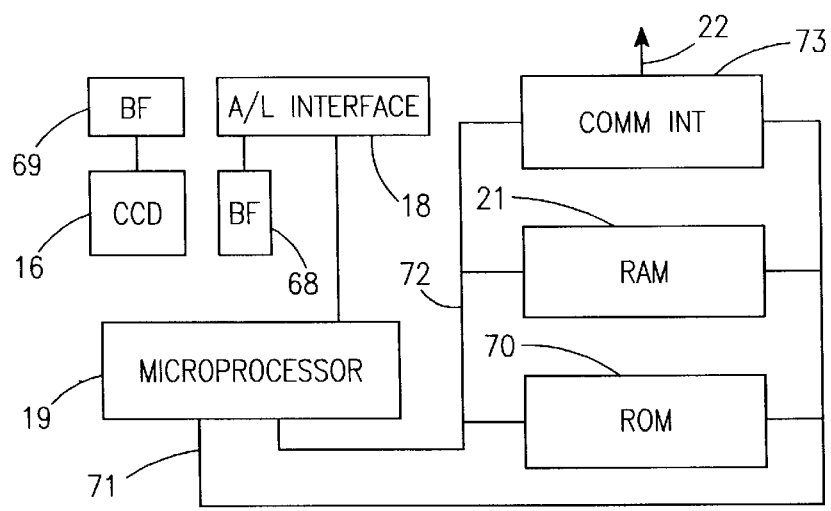
FIG. 3 is a block diagram illustrating a typical logic arrangement of a microprocessor circuit and major functional components as are typically associated with such a circuit, and further illustrating an interface between the array of photosensors of the reader as referred to in FIG. 2 and the microprocessor and the range finder and motion sensing and control mechanism thereof.

FIG. 3 is a simplified functional block diagram showing the photosensor array ("CCD") 16 coupled through typical driver circuits ("BF") 68 and 69 to the analog/logic interface ("A/L INTERFACE") 18. The data signal output from such typical interface circuit 18 would be coupled directly to the above referred-to microprocessor circuit ("MICROPROCESSOR") 19, such as a processor TMS320C25 as provided by Texas Instruments. It is to be understood that other devices may be available and may be substituted therefor. For example, the device 19 may provide 4K words of On-Chip Program ROM and 544 words of programmable On-Chip RAM.

Typically, such minimum ROM (Read Only Memory) and RAM (Random Access Memory) may be supplemented with further programmable memory, such as the memory ("RAM") 21, and with additional read only memory ("ROM") 70. The processor circuit 19 may address and transfer such additional memory by typical address and data buses 71 and 72, respectively. Data may also be transferred to a suitable communication interface ("COMM.INT.") 71, which in turn is coupled to the above referred-to communication link 22, which may be an RF or an optical link. It should be understood that the specifically described elements and their functions are merely for explanatory purposes and various changes may be possible within the scope hereof.

Figure 8:
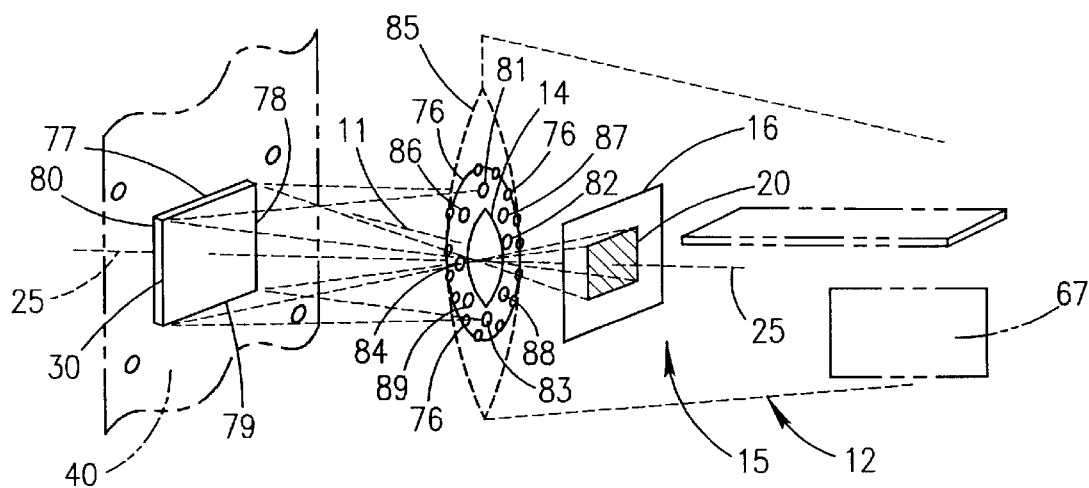
FIG. 8 is a diagrammatic illustration showing the reader of FIG. 2 and illustrating alternative embodiments relating to flashable light sources and aiming aids such as marker sources.

As a further example, FIG. 8, similarly to that shown in FIG. 2, shows the supporting surface 40 with the label 30, such as a stacked bar code, for example, in relationship to the hand-held optical reader unit 12. The reader unit 12 also preferably includes typical optics 14 and a photosensor array 16 disposed in a focal plane at an interior plane or region 15 behind the optics 14. An image 20 of information representative of the information on the label 30 may be formed on the photosensor array 16 when the reader 12 is activated by instantaneously illuminating an area ahead of the reader 12 and hence the supporting surface 40 in the region of the label 30 when the reader optical axis 25 is aimed toward the label 30. The illuminator 11 is generally a flashable xenon tube which may, of course, comprise any number of flash type illuminators 11.

FIG. 8 therefore illustrates an annular illuminator 11 which is comprised of a number of discrete pulsable light emitting diodes 76. The light emitting diodes are preferably disposed adjacent the exterior portion of the optics 14 of the reader 12 in a plane perpendicular to the optical axis 25, substantially similar to the arrangement of the xenon flash tube shown in FIG. 2. The number of discrete light emitting elements 76 may be chosen to correspond to a total light intensity needed to illuminate the exterior region of the label 30. Depending on the desired range over which the reader 12 is to function, the number of discrete devices may be increased by closer spaces between adjacent ones of the light emitting diodes 76.

FIG. 8 illustrates another change in the described arrangement with respect to the previously described marker sources, such as the light emitting diodes 36 through 39 or the light sources 55 including lenses 57. Even though it is presently considered advantageous to project beams from the marker sources through the optics 14, within reason it is possible to also project marker spots or bars, such as bars 77, 78, 79 or 80, against the surface 40 from respective marker light sources 81, 82, 83 and 84 without having the projected beams directed through the optics 14 of the reader 12. Thus, the marker light sources 81 through 84 may be disposed externally of the optics 14 and on a frontal portion 85 of the reader 12. The lenses 57 of the light sources 81 through 84 may be disposed to direct the respective marker beams of the light sources substantially along the periphery of the field of view of the optics 14 of the reader 12.

As described with respect to FIG. 7, the lenses 57 may be shaped to linearly shape the emitted light of the marker sources in two mutually opposite directions or at an angle other than 180 degrees, depending on the location of the light sources. A disadvantage may possibly be noticed in that the marker sources are not in total alignment with the periphery of the field of view of the optics 14. Consequently, at extremes of an operating range of the reader 12, resulting marker bars or spots, such as the marker bars 77 through 80 shown in FIG. 8, may not delineate precisely the area 45 which corresponds precisely to the active photosensor array 16 projected against the surface 40 through the optics 14. However, only at close range, the marker spots or bars 77 through 80 may form on the surface 40 somewhat externally of the actual area 45, hence indicating an area larger than one that may be read by the reader 12. When the sources are properly placed, such deviation may be confined to a range at which normally no readings are taken. At a medium range, the marker bars may be disposed to clearly delineate the area 45. Similarly, an area smaller than the actual area 45 may be indicated at an extended distance for reading the label 30. Thus, for practical purposes the marker sources may be oriented such that the predetermined area 45 is bracketed for substantially all readings.

It should be understood that not only light sources for generating the bars 77 through 80 may be disposed externally of the optics 14, but light sources disposed to project marker beams generally to corners of the rectangular area 45 may be disposed externally of the optics 14. Such alternate light sources 86, 87, 88 and 89 may similarly be disposed as closely as feasible adjacent the optics, and actually may be disposed within the annular configuration of flashable illuminator source elements 76, as shown in FIG. 8. With respect to the latter sources, lenses 57 may be disposed to linearly expand the respective marker beams at right angles so as to bracket the area 45 as indicated in FIG. 6, for example. It should be understood that various other changes suggest themselves from the arrangements as disclosed herein.

Figure 9:
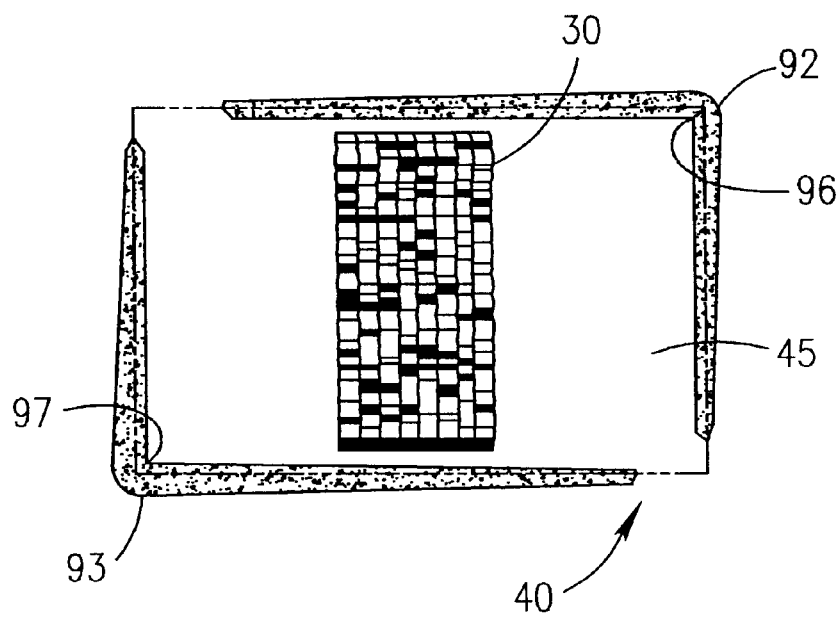
FIG. 9 shows another embodiment for delineating to a user of the reader its field of view, also showing a stacked bar code label encompassed in a vertical orientation within the delineated field of view.
Figure 10:
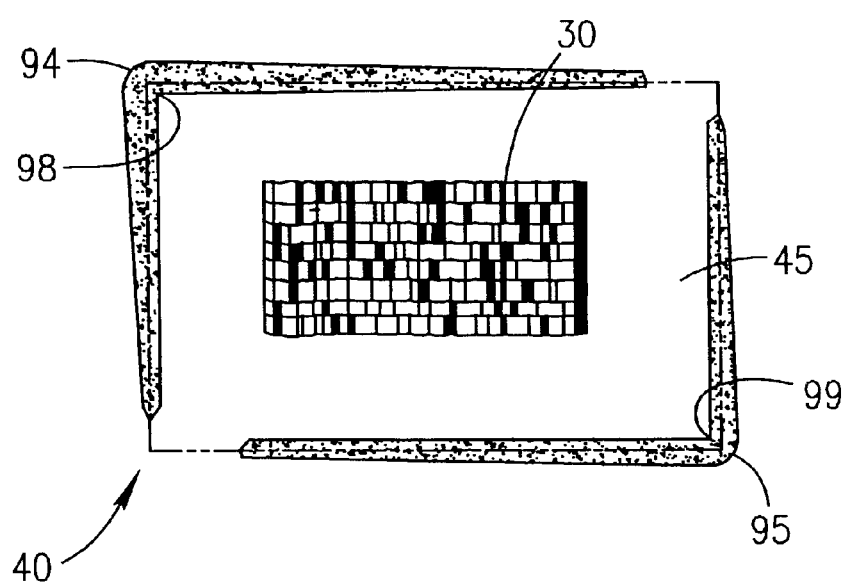
FIG. 10 shows a variation of the embodiment of FIG. 9 for delineating the field of view of the reader, also showing a stacked bar code label encompassed in a horizontal orientation within the delineated field of view.

As an example of changes or variations in delineating the area 45 within the field of view of the reader 12, the marker sources may be advantageously limited in numbers. FIGS. 9 and 10 depict an example of another arrangement of marker sources, the respective impinging marker spots being identified by numerals 92 and 93 in FIG. 9 and by numerals 94 and 95 in FIG. 10. In each of these arrangements, the marker sources are disposed to generate marker beams impinging on the surface 40 as the respective marker spots 92, 93, 94 and 95 with the earlier described right angle expansion from diagonally opposite corners 96 and 97 of the delineated area 45 as shown in FIG. 9, and from corners 98 and 99 of such area 45 as shown in FIG. 10. Also, the orientation of the label 30 depicts a substantially vertical or heightwise arrangement with respect to the area 45 in FIG. 9, and a substantially horizontal or widthwise arrangement of the label 30 with respect to the area 45 in FIG. 10. The different orientations of the respective label 30 in each instance further illustrate the above described advantage of the reader 12 in providing for the capture of an area of information on the photosensor array 16 independent of the orientation of such information about the optical axis 25 of the reader 12.

With respect to the shape of the photosensor array 16, photosensor arrays of the current state of the art are generally of rectangular shape or at least the active areas are of rectangular shape. While an embodiment discloses a generally circular lens or optics 14, the shape thereof is preferred because of the generally rectangular shapes of so-called targets or photosensor arrays 16 of video cameras. It should be understood that the invention in its broad scope may not depend on a sensing area of any particular shape.

The ability to capture and manipulate an entire image with a portable unit has important benefits for optical character reading also. In such instances, a reading area of elongate rectangular shape may be preferred. For example, the described embodiments allow the use of image enhancement algorithms, e.g., of the type developed for enhancement of deep space probe images, as well as image normalization, e.g., such as image rotation and scaling. Non-linear scaling for improving recognition efficiency with respect to irregular surfaces such as curved surfaces, and with respect to off-axis viewing angles as herein described, is also feasible.

Figure 11:
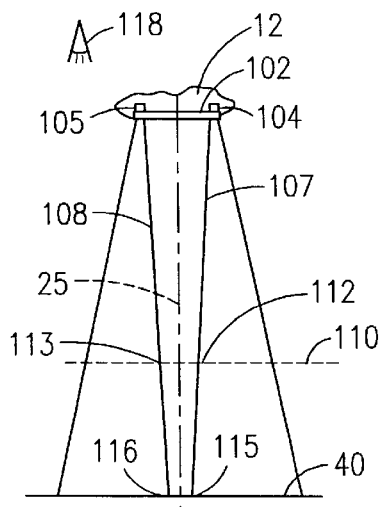
FIG. 11 shows a pair of marker beams converging toward an optical axis of the optical reader as a function of the spacing of the optical reader from a target area, in accordance with the present invention.

In some applications, it may be desirable to use a handheld optical reader having a fixed focal length, such as for example a Delivery Information Acquisition Device ("DIAD") as provided by United Parcel Service of America, having a focal length of approximately 8.5 inches from a window 102 thereof and a depth of focus of approximately ±2 inches. In that event, spacing of the reader 12 becomes substantially more critical. For such applications, the present invention provides at least one of the light sources 38, such as light sources 104 or 105 as shown in FIG. 11, wherein the respective beam, 107 or 108, converges toward the longitudinal optical axis 25. As the supporting surface 40 is moved toward the window 102 of the reader 12 such as, for example, spacing the supporting surface 40 at the phantom line indicated by the numeral 110 in FIG. 11, a marker spot 112 or 113 cast on the supporting surface 40 is spaced farther from the longitudinal axis 25 than the corresponding marker spots 115 and 116 for the supporting surface 40 spaced as shown.

Figure 12A:
FIGS. 12a–d shows a schematic representation of the relationship of marker spots cast on the target area as the spacing between the optical reader and the target area is varied.

As an example of the arrangement shown in FIG. 11, assume the arrangement illustrated therein as incorporated into a DIAD reader having a focal length of 8.5 inches and a target area of 6.5 inches wide by 4.0 inches high. Further assume that the light sources 104 and 105 are disposed along the wide ends of the window 102 such that the marker spots 115 and 116 are cast on the supporting surface 40. Also assume that both of the light sources 104 and 105 are operative and the resultant beams 107 and 108 therefrom converge toward each other and toward the longitudinal axis 25 such that the marker spots 115 and 116 touch each other, as shown in FIG. 12a, as the reader 12 is spaced at the optimum focal distance from the supporting surface 40, such as at 8.5 inches.

Figure 12B:
Figure 12C:
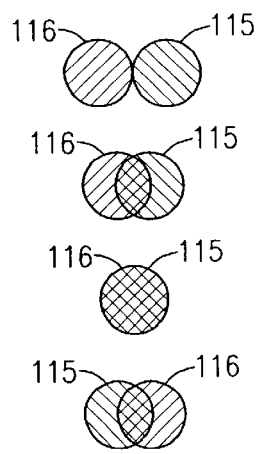

Now assume that the reader 12 is moved farther away from the supporting surface 40 such that the marker spots 115 and 116 overlap, as shown in FIG. 12b. If the reader 12 is moved even farther away from the supporting surface 40, a distance will be reached whereby the marker spots 115 and 116 coincide as shown in FIG. 12c. Similarly if the reader 12 is moved closer than the optimum focal distance from the supporting surface 40, the marker spots 115 and 116 will move apart. In other words, it would be visibly obvious to a user of the present invention, by observing the relationship between the two marker spots 115 and 116, to know which direction the reader 12 must be moved relative to the supporting surface 40 in order to bring the target area 45 into optimum focus.

Figure 12D:

In some applications it may be preferable to adjust the convergence of the beams 107 and 108 such that the marker spots 115 and 116 coincide, as shown in FIG. 12c, as the reader 12 is spaced at the optimum focal distance from the supporting surface 40. In that event, the overlapping relationship shown in FIG. 12b would exist as the reader 12 is spaced closer than the optimum focal distance from the supporting surface 40, whereas the overlapping relationship shown in FIG. 12d would exist as the reader 12 is spaced farther than the optimum focal distance from the supporting surface 40.

For such an application, it may be preferable to use light sources which cast colored marker spots 115 and 116, e.g., red and blue, such that the switching in positions of the colored marker spots 112 and 113 would indicate that the reader 12 has been displaced through the optimum focal distance from the supporting. surface 40.

As an example of the size of the marker spots 115 and 116, if the spots 115 and 116 have a diameter of approximately ¼ inch at the window 102, then those spots would have a maximum dimension of approximately ½ inch at a distance of approximately 10 inches from the window 102. As a result, the marker spots 112 and 113 are easily visible to a user of the reader 12.

If the reader 12 is being used such that the longitudinal axis 25 is substantially perpendicular to the supporting surface 40, the view of the marker spots 115 and 116 from a user's eye spaced at 118, as shown at FIG. 11, may be somewhat obstructed by the reader 12. As a result the user may need to position his head somewhat to the side of the reader 12 in order to see the relationship of the marker spots 115 and 116 on the supporting surface 40. If, however, the reader 12 is of the type that reads at an oblique angle, then the user can view the marker spots 115 and 116 without obstruction from the reader 12 by sighting along the handheld unit 12.

Figure 13:
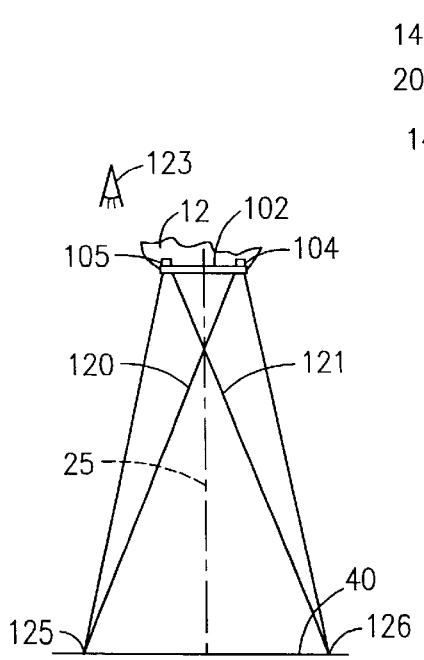
FIG. 13 shows a pair of marker beams crossing the optical axis between the optical reader and the target area.

For those applications wherein the reader 12 is used with the longitudinal axis 25 spaced substantially perpendicularly to the supporting surface 40, then the light sources 104 and 105 may be arranged whereby the respective beams 120 and 121 therefrom converge toward and cross over the longitudinal axis 25 at a distance from the window 102 which is less than the preferable focal length of the reader 12. Thus, a viewer having an eye spaced at 123, as shown at FIG. 13, has an unobstructed view of a marker spot 125 cast by the light source 104. In that event, the user can sight along the side of the reader 12 to determine whether the spacing of the marker spot 125 corresponds with marker spots normally observed as the reader 12 is spaced at the optimum distance from the supporting surface 40. If the marker spot 125 is too closely spaced to the longitudinal axis 25, that indicates to the user that the reader 12 must be moved farther away from the supporting surface 40 causing the marker spot 125 to move outwardly to the relative spacing normally observed at the optimum spacing of the reader 12 from the supporting surface 40. Similarly, if the user observes that the marker spot 125 is spaced too far outwardly from the longitudinal axis 25 relative to the spacing normally observed as the reader 12 is properly spaced from the supporting surface 40, then it is obvious that the reader 12 should be moved closer to the supporting surface 40 in order to realize the optimum focal distance for the reader 12.

In the example just described, only one of the light sources 104 and 105 are required. The DIAD device hereinbefore mentioned has an arrangement whereby the light sources 104 and 105 can be individually operated such that each of the light sources 104 or 105 can be separately used, such as using one of the light sources 104 or 105 for left-handed operation and using the other one of the light sources 105 or 104 for right-handed operation. By using only one light source in those situations, the energy drain on the portable power supply of the reader 12 can be substantially reduced.

It is to be understood that an application of the invention as indicated in FIG. 13 may be arranged whereby the marker spots 125 and 126 may be cast either inside or outside of the sensing area 10 as desired.

For some applications it may be desirable to use a bullseye 128. The bullseye 128 may have any configuration such as that described in U.S. Pat. No. 4,896,029, issued Jan. 23, 1990 to Chandler, et al. In that event, the bullseye 128 may be comprised of concentric rings having an outer diameter of approximately 8 millimeters. For those applications using a bullseye and one of the marker beams 107 or 108, the spacing of the corresponding marker spots 115 or 116 may be utilized to not only space the reader 12 at the appropriate distance from the supporting surface 40 but may also be used to space the reader 12 appropriately relative to the target area 30 by manually moving the reader 12 such that the marker spot 115 or 116 is superimposed on the bullseye 128.

Similarly, one of the readers 12, having two of the marker beams 107 and 108 such that both of the makers spots 115 and 116 are cast on the supporting surface 40, may be utilized to not only properly space the reader 12 relative to the supporting surface 40, but may also be used to position the reader 12 relative to the label 30 by placing the marker spots 115 and 116 over the bullseye 128, or one at each side thereof as desired.

Figure 14:
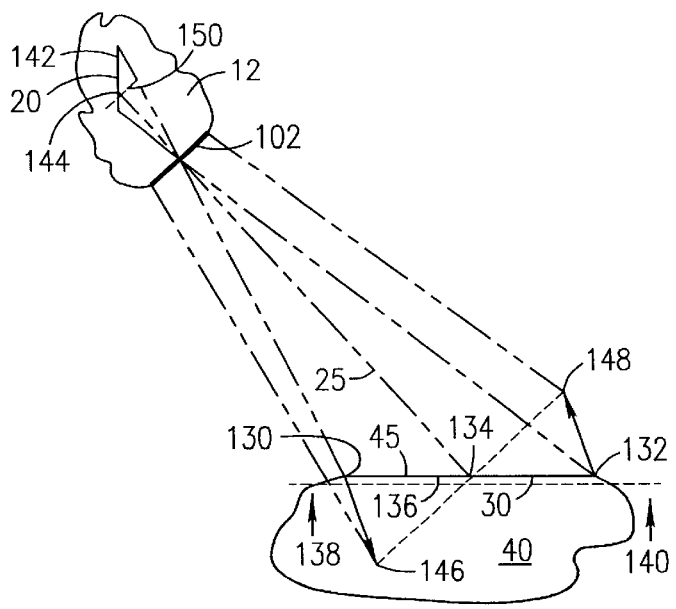
FIG. 14 shows a schematic representation of the optical reader being used to obliquely scan the target area and an effective reoriented age electronically generated therefrom.

For those applications wherein the reader 12 is used with the longitudinal axis 25 oriented obliquely to the target area 45, such as the arrangement schematically illustrated in FIG. 14, the generated image 20 will be skewed or distorted. For example, assume that the optical axis 25 lies in the plane of FIG. 14. Also assume that the label 30 being scanned has a leftmost extremity 130 and a rightmost extremity 132 as viewed edgewise in FIG. 14, wherein both of the extremities 130 and 132 are disposed within the depth of focus of the optical scanner 12. Then, the coded information lying in the plane of the label 30 along a line perpendicular to the optical axis 25, i.e., perpendicular to the plane of FIG. 14 as indicated by the reference numeral 134, sometimes referred to herein as the baseline or undistorted axis, is basically undistorted from the viewpoint of the optical reader 12. On the other hand, coded information spaced off-baseline with a coordinate along a distorted axis 136 perpendicular to the undistorted axis 134, such as between the extremities 130 and 132, is distorted relative to the viewpoint of the optical reader 12. The distortion appears as an apparent foreshortening of respective rectilinear spacing of various elements of the coded information of the label 30 from the undistorted axis 134.

The magnitude of the overall distortion is dependent upon the degree of obliqueness at which the label 30 is being scanned; the greater the obliqueness, the greater the distortion. In addition, the magnitude of the distortion is dependent upon the spacing of the label 30 within the field of view of the optical reader 12. Coded information spaced near the back of the field of view, as indicated by the numeral 138 in FIG. 14, will generally be distorted to a greater extent than coded information spaced near the front of the field of view, as indicated by the numeral 140 in FIG. 14.

In effect, the generated image 20 is preferentially magnified along an axis 142, corresponding to the distorted axis 136, to a greater extent than it is along an axis 144, perpendicular to the plane of FIG. 14, corresponding to the undistorted axis 134 of the label 30.

For example, an optical reader 12 with its optical axis 25 arranged perpendicularly to the target area 45 may have a substantially uniform magnification of ten-to-one over the generated image, as hereinbefore described. As the reader 12 is being used for oblique scanning, the distortion can be corrected as follows: 1) by increasing the magnification of the generated image 20 to greater than ten-to-one along the axis 142 corresponding to the distorted axis 136 while maintaining the magnification at ten-to-one along the axis 144 corresponding to the undistorted axis 134; 2) by maintaining the magnification at ten-to-one along the axis 142 corresponding to the distorted axis 136 while decreasing the magnification to less than ten-to-one along the axis 144 corresponding to the undistorted axis 134; or 3) by increasing the magnification to greater than ten-to-one along the axis 142 corresponding to the distorted axis 136 while decreasing the magnification to less than ten-to-one along the axis 144 corresponding to the undistorted axis 134. The relative change(s) in magnification is, of course, dependent upon which of the three methods are used, the angle at which the oblique scanning is conducted, the spacing of the label 30 or other coded information within the field of view of the optical reader 12, etc.

The arrangement illustrated in FIG. 14 corrects the distortion caused by oblique scanning by providing the reader 12 with increased resolution (number of pixels per row and column) of the sensor 16 to electronically modify the apparent height-to-width ratio of the generated image 20 to more closely correspond to the height-to-width ratio of the label 30. Preferably, the height-to-width ratio of the corrected image 150 is similar to that of the label 30. It is to be understood, however, that it is unnecessary for some applications to reconstruct the generated image such that is has a height-to-width ratio exactly equal to that of the coded information being scanned. For those cases, it is only necessary to enlarge the generated image 20 along the axis 142 corresponding to the distorted axis 136 of the obliquely scanned label 30 whereby the coded information thereon can be accurately and reproducibly read by the reader 12.

Such electronic correction of the oblique-scanning distortion, in effect, is substantially equivalent to physical rotation of the label 30 about the axis 134 such that the extremities 130 and 132 appear, from the viewpoint of the reader 12, to be respectively spaced as illustrated by the numerals 146 and 148 in FIG. 14.

Alternatively, the sensor may also be oriented obliquely, such that the plane of the sensor substantially coincides with the plane of the generated image 20 as shown in FIG. 14. In that event, the distortion caused by oblique scanning may be sufficiently automatically corrected with the sensor obliquely oriented whereby further distortion correction processing is unnecessary.

Preferably, the coded information is approximately centered along the optical axis to avoid additional distortion which might otherwise be caused by spacing the coded information nearer the rear of the field of view as hereinbefore mentioned and thereby minimizing variation of distortion within the scanned image of the coded information arising from portions of the coded information being positioned nearer the rear of the field of view than other portions of the coded information. For example, although scanning with the optical axis at an oblique angle of 45° is within the scope of the present invention, scanning with the optical axis at an oblique angle of 30° provides a scanned image with reduced depth variation, which would otherwise result due to portions of the coded information being positioned more closely to the rear of the field of view than other portions thereof.

It is to be understood that the original height-to width ratio of the label 30 or other two-dimensional coded information may be included as an integral part of the coded information, such as the bullseye hereinbefore mentioned. In that event, such ratio would be designed such that it could be accurately read without correction at any angle of obliqueness within the range of oblique scanning angles available to a particular optical reader. Then, having scanned and processed that ratio information, the associated components of the optical reader 12 as herein described can be utilized to automatically correct for the oblique distortion as herein described.

For example, algorithms can be provided which identify a bullseye constructed of concentric circularly shaped rings, as hereinbefore described. Due to oblique scanning, the scanned image of the bullseye will appear oval-shaped instead of circular. The algorithms can electronically compare the maximum dimension of the oval-shaped image with the minimum dimension thereof, and determine the magnitude and the axis (or axes) along which the magnification of the image must be increased (and/or decreased) in order to adjust the height-to-width ratio of the scanned image to substantially match the height-to-width ratio of the label 30 within acceptable limits for accurate reading of the label 30 as hereinbefore described.

It is to be understood that, in addition to or instead of a bullseye, the outline of the label 30 itself may be used as a reference of the magnitude of distortion arising from oblique scanning. For example, a 1"×1" two-dimensional code, such as that described in U.S. Pat. No. 4,896,029, issued Jan. 23, 1990 to Chandler et al. (col. 10, lines 60–67), which is incorporated herein by reference, can provide such a reference. By electronically comparing the ratio of the apparent height to width ratio of an image scanned from one of the Chandler-type codes, the magnitude of preferential magnification needed to sufficiently correct the obliqueness distortion can be determined.

Figure 15:
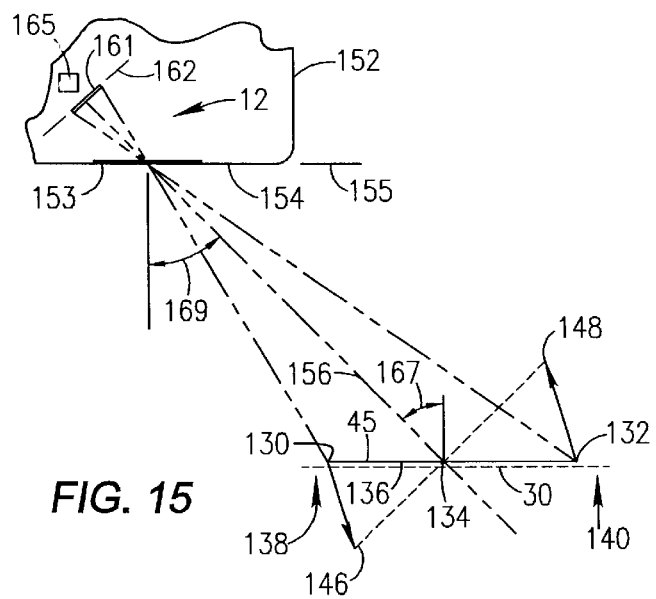
FIG. 15 shows a schematic representation of the optical reader being used to obliquely scan the target area, similar to that shown in FIG. 14, showing an image sensor oriented perpendicularly to the optical axis thereof, in accordance with the present invention.
Figure 16:
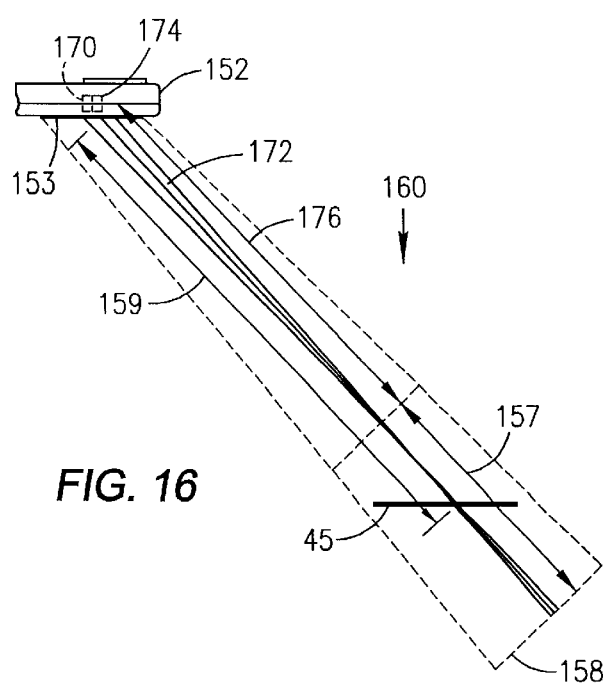
FIG. 16 shows a schematic representation of a side elevational view of a laser scanner of the optical reader being used to obliquely scan the target, in accordance with the present invention.
Figure 17:
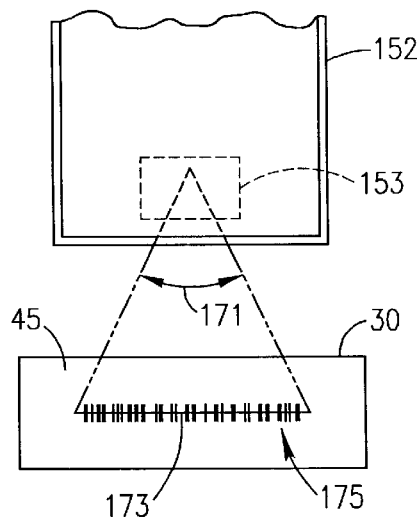
FIG. 17 shows a fragmentary, top view of a tablet configuration terminal unit showing the laster scanner projecting a linear mark on a linear bar code, in accordance with the present invention.

The primary emphasis of the present invention also involves oblique scanning of the label 30 or other coded information with a hand-held terminal unit 152 containing the optical reader 12, as illustrated in FIGS. 15–17. Many of the features of the present invention are similar to those hereinbefore described, particularly those in regard to FIG. 14, and will not be reiterated here in detail.

The hand-held terminal unit 152 permits accurate scanning of images from optical indicia on a target surface oriented obliquely to the optical axis of the reader by substantially eliminating image distortion normally inherent in such oblique scanning. Preferably, the portable terminal unit 152 has a tablet configuration as appropriately sized dimensions of the hand-held terminal unit 152, such as a width of six to seven inches, are an essential factor to be taken into consideration, particularly as an aid for easily and conveniently aiming the unit 152 at the label 30. For example, the DIAD device, hereinbefore mentioned and having a width, length and thickness of approximately 6.7, 12 and 1.44 inches, respectively, has such dimensions.

The terminal unit 152 also has an optical window 153 disposed at or near an underside 154 thereof defining a major plane 155, an optical axis 156 directed obliquely through the window 153, and a given depth of field 157 and field of view 158 at a given range 159 from the window 153, as illustrated in FIG. 16. For example, the reader 12 contained in the unit 152 may have a fixed focal length of 8.5 inches and a depth of field of 4.0 inches, such that the non-close-up range as hereinafter described extends from a range 6.5 inches to 10.5 inches. As the terminal unit 152 is disposed with the major plane 155 oriented substantially horizontally, as illustrated in FIGS. 15 and 16, at least a portion 160 of the field of view 158 of the optical reader 12 is horizontally displaced from the terminal unit 152.

The optical reader 12 has an area-type image sensor 161 disposed substantially perpendicularly to the optical axis 156, as illustrated in FIG. 15, which tends to optimize the focus of the optical reader 12 on a portion of the target surface 45, which is horizontally offset from the terminal unit 152 and is intersected by the optical axis 156 as the target surface 45 is disposed obliquely to the optical axis 156. It is to be understood that the present invention is equally applicable to applications where the target surface 45 is disposed perpendicularly to the optical axis 156. The image sensor 161 defines a sensor plane 162.

The terminal unit 152 also includes processing means 165, as hereinbefore described, for transforming an image, scanned from a portion of the target surface 45, which is disposed substantially parallel to the major plane 155, to a generated image effectively corresponding to a scanned image which would be obtained with if the portion of the target surface 45 had been oriented substantially perpendicularly to the optical axis 156.

The processing means 165 includes a decode processor capable of decoding a two-dimensional code for an angular deviation 167 of the optical axis 156 from a normal line perpendicular to the plane of the coded label 30 by a maximum angle not greater than an angle 169 of the optical axis 156 relative to a normal line perpendicular to the major plane 155 of the terminal unit 152, as illustrated in FIG. 15.

For some applications, the terminal unit 152 has a converging ranging marker beam 31, which crosses the optical axis 156 and produces a linear mark 47 on the target surface 45 at a distance from the optical axis 156 wherein said distance is a function of the range 159 of the target surface 45 from the terminal unit 152, substantially similar to that hereinbefore described and as illustrated in FIGS. 11 and 13.

Focussing by use of ranging marker beams, which can be readily combined with the obliqueness correction of the present invention, are hereinbefore described and will not be re-iterated here in detail. It is to be understood that automatic focussing techniques, which are well-known in the art, can also be combined with the various embodiments described herein.

The improved apparatus may also include a laser scanner 170, such as a laser diode oscillating through an angle 171 as illustrated in FIG. 17, which is adapted to generate and direct a fan-shaped pattern with a laser beam 172, such as perpendicularly to the plane of FIG. 17, to produce a linear mark 173 and a reflected laser light sensor 174 responsive to the laser scanner 170, wherein the laser scanner 170 is adapted to generate a linear bar code signal in the event that the linear mark 173 coincides with a linear bar code 175 on the target surface 45.

Further, the laser scanner 170 and reflected laser light sensor 174 may be adapted to be responsive to a close-in range of positions of the linear bar code 175 along the optical axis 156 wherein the area-type image sensor 161 is ineffective for reading the linear bar code 175, such as within a range 176 which lies outside of, and nearer to the terminal unit 152 than, the depth of field 157, as illustrated in FIG. 16.

The laser scanner 170 can be utilized to automatically determine the range 159 of the target area 45, by methods described herein or as known in the trade. If the target area 45 is determined to be close-up, the label 30 can be substantially simultaneously scanned for the linear bar code 175 and a signal therefrom, as detected by the reflected laser light sensor 174 as a function of the reflected light from the laser beam 172, can be processed as hereinbefore described.

Similarly, if the target area 45 is non-close-up, such that compact or two-dimensional area codes on the label 30 can be accurately read by the reader 12, such as where the target area 45 lies within the depth of field 157 and within the field of view 158, the laser beam scanner 170 can be automatically deactivated, with processing of the scanned image proceeding as hereinbefore described.

The current invention includes the steps for reading indicia, including linear bar codes and compact area codes on a label, as described herein. Those steps include activating the laser beam scanner 170 to generate and direct a laser beam 172, which is capable of scanning linear bar codes and compact area codes at close-up distances and positioning the terminal unit 152, which contains the laser beam scanner 170 and which is capable of generating and directing a field of view on or about the label 30, so that the generated and directed laser beam 172 intersects the label 30. The improved method may also include the steps of utilizing the laser beam 172 to determine whether the unit 152 is spaced close-up to the label 30 such that the compact area codes on the label 30 cannot be accurately read by the reader 12 or whether the unit 152 is spaced non-close-up to the label 30 such that the compact area codes on the label 30 can be accurately read by the reader 12; and scanning the label 30 and storing a signal obtained as a function of reflected light from the laser beam 172 as the label 30 is spaced close-up to the unit 152, and deactivating the laser beam scanner 170 and registering the field-of-view on or about the label 30 as the label 30 is spaced non-close-up to the unit 152.

Typically, a user of the portable terminal unit 12 having a tablet configuration moves the unit 12 from out of range of the target area 40 toward the indicia 30 on the target area 40. As the unit 12 is brought into range of the target area 40, for example 10.5 inches therefrom, the reader 12 is typically triggered even though the reader 12 may not be spaced at the optimum focus distance from the target area 40, such as for one of the readers 12 having a fixed focal length of 8.5 inches and a depth of field of 4 inches. The terminal units 12 having a range finder 26 which indicates that the unit 12 is outside of an acceptable range from the target area 40, such as closer than 6.5 inches or farther than 10.5 inches for the example reader, then the unit 40 may also include a motion sensing and control mechanism 27 adapted to prevent triggering of the reader 12 until the reader 12 is within an acceptable range, such as between 6.5 to 10.5 inches from the target area 40.

Preferably, for one of the readers 12 having a fixed focus, the motion sensing and control mechanism 27 is adapted to permit triggering of the reader 12 as the unit 12 is spaced from the target area 40 within a tighter tolerance range about the optimal focus length, such as within 8.5±0.5 inches for the example reader 12. Also, the motion sensing and control mechanism 27 may be adapted to determine when the unit 12 is spaced such that the target area 48 is within the depth of field of the reader 12 and, even though the unit 12 may not spaced within the aforesaid tighter tolerance range, the motion sensing and control mechanism 27 may permit triggering of the reader 12 should it determine that the user has stopped the motion of the unit 12 or, alternatively, has reversed the motion of the unit 12 such that the reader 12 is being moved farther away from the tighter tolerance range.

For example, the unit 12 may include sensors and software with appropriate sets of decode routines to detect and compare the spacing and change of spacing of the marker spots 115 and 116, as illustrated in FIGS. 12*a*–*d*, to determine range of the unit 12 from the target area 40 and, further, to determine movement toward or away from, or, indeed, non-movement of, the unit 12 relative to the target area 40.

Figure 18A:
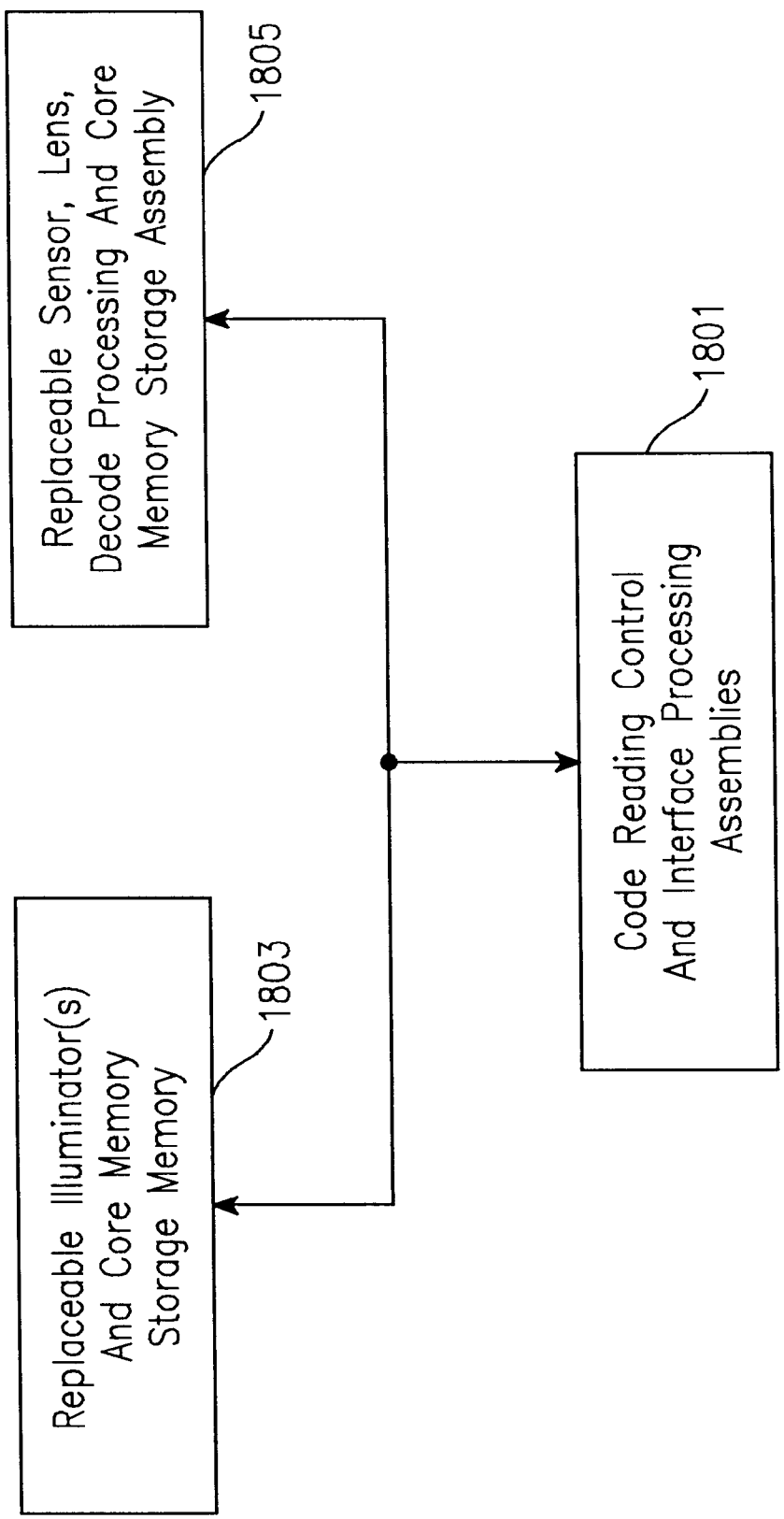
FIG. 18a is a schematic block diagram which illustrates the replaceable units of functionality found in code readers built in accordance with the present invention.

FIG. 18*a* is a schematic block diagram which illustrates the replaceable units of functionality found in code readers built in accordance with the present invention. A block 1801 represents components which provide the code reading control and interface processing functionality (hereafter the "control elements") which can be found in both hand-held and tablet based code readers, for example. The control elements may be distributed between one or more assemblies and/or independently mounted.

A block 1803 represents a unitary, replaceable assemble that contains one or more illuminators, associated control and drive circuitry, and a means to store core memory (hereinafter a "illuminator assembly"). Similarly, a block 1805 also represents a unitary, replaceable assembly. The block 1805 includes a sensor (or sensors), a lens system, decode processing circuitry and a means for storing core memory (hereinafter a "sensor assembly").

As discussed in detail below, although both the illuminator and sensor assemblies both contain a means for storing core memory, the means containing the most recent data and code will be relied upon most heavily during the code reading process. Thus, when upgrading only a sensor assembly, for example, the data and code stored on the new sensor assembly can not only supersede that on the old (replaced) sensor assembly, but also supersedes appropriate data and code on the illuminator assembly. As a result, an upgrade of one of the replaceable assemblies does not require a memory upgrade on any other assembly.

Moreover, with such a grouping of replaceable functionality, a user may initially purchase a code reader having low cost illuminator and sensor assemblies and later easily upgrade either or both assemblies when the need arises without having to buy a new code reader.

In portable applications, upon turning on the code reader, battery power is delivered to the circuitry and components within each of the blocks 1801, 1803 and 1805. Thereafter, certain control elements of the block 1801 interrogate the core memory storage of both the illuminator and sensor assemblies to identify the current configurations and typical power requirements expected in performing a typical code reading event. The control elements of the block 1801 use the current configuration of the assemblies to identify compatible illuminator, sensor and decode combinations that might be used for reading codes (or capturing images). If more than one combination is available, the control elements order the available combinations based on the overall power requirements of such combinations. Thereafter, the assemblies of blocks 1803 and 1805 are placed in a low power ("standby") mode awaiting an indication of an attempted read.

Upon detecting a code reading attempt (e.g., a user pressing the trigger or a proximity detection), the control elements of the block 1801 respond by causing the assemblies of the blocks 1803 and 1805 to exit the standby mode to begin a read attempt. The control elements direct the selection of one of the compatible illuminator, sensor, decode, etc. combinations to attempt a read. If the read is successful, the control elements of the block 1801 conclude the reading process by causing the assemblies of the blocks 1803 and 1805 to reenter the standby mode. If the reading process fails, the control elements of the block 1801 select one of the remaining compatible combinations (if any) and reattempts the read. As before, if the read proves successful, the control elements cause the assemblies of the blocks 1803 and 1805 to reenter the standby mode, else another combination (if any) is attempted. This process continues until either all compatible combinations fail or a successful read is obtained. Thereafter, the assemblies of the blocks 1803 and 1805 are placed in the standby mode.

The control elements of the block 1805 make selections from the available compatible combinations based on three factors. First, power utilization is considered. If a successful read can be achieved using a lesser amount of power with one combination than another, the combination with lowest power is preferred. However, power utilization must take into account the likelihood that a given combination will achieve success at reading a specific type of code. Thus, as a second factor, the control elements factor in the probability of success of reading a code type.

In some embodiments of the present invention, the probability of success for reading each code type is permanently set to a "factory default" that is established with lab test data. In another embodiment, actual results achieved in a user's environment is used by the control elements to modify factory default probabilities.

Lastly, the control elements of the block 1801 consider the probability of encountering each code type as the third factor. Initially, such probability is distributed equally among all code types as a factory default. However, in the user's environment, as codes are actually read, the probabilities are modified.

For example, if a code reader is configured with both 1-D scanning laser and 2-D flash illuminators and a 2-D photodetector array, two compatible configurations (e.g., the laser and array combination and the flash and array combination) can be used to read 1-D code types while one compatible configuration (e.g., the flash and array combination) provides support for 2-D code types. With factory default settings, assuming the code reader prefers to use the laser combination first backed up by the flash combination, read attempts are made. If the code reader is used in an environment in which 2-D code types are read most often, the control elements of block 1801 begin to modify the probabilities of code type occurrence such that the code reader effectively adapts to the environment by reordering the available combinations, i.e., selects the flash combination first backed up by the laser. Similarly, in an environment in which codes are damaged or smudged, a code reader may learn to prefer the flash combination over the laser combination.

More particularly, preference (Pref) is computed using the following formula:

Pref=$\Sigma(P_{Rk}*P_{Ek})/P$, where k=code type 1 through type n

Thus, for a given combination, preference (Pref) is computed as follows: 1) setting Pref to zero; 2) selecting a code type; 3) multiplying the probability that the selected code type will be successfully read ($p_{rk}$) by the probability that the selected code type will be encountered ($p_{ek}$) and dividing by the power (P) needed to perform the read operation for the selected code type; 4) adding the result to Pref; and 5) if any code types have not been considered, selecting an unconsidered code type and branching to step 3) above. From this procedure, a total value from Pref will result.

After computing the preference for each compatible combination, the control elements of the block 1801 order the combinations based on preference. The higher the preference, the higher the order. A combination with the highest preference will be attempted first, and that with the lowest preference attempted only when all others fail.

In one embodiment, there are only two code types: 1-D and 2-D. In another embodiment, the code reader assigns a code type for each and every 1-D code and 2-D code standard. In either embodiment, the standard formula for preference remains unchanged.

Figure 18B:
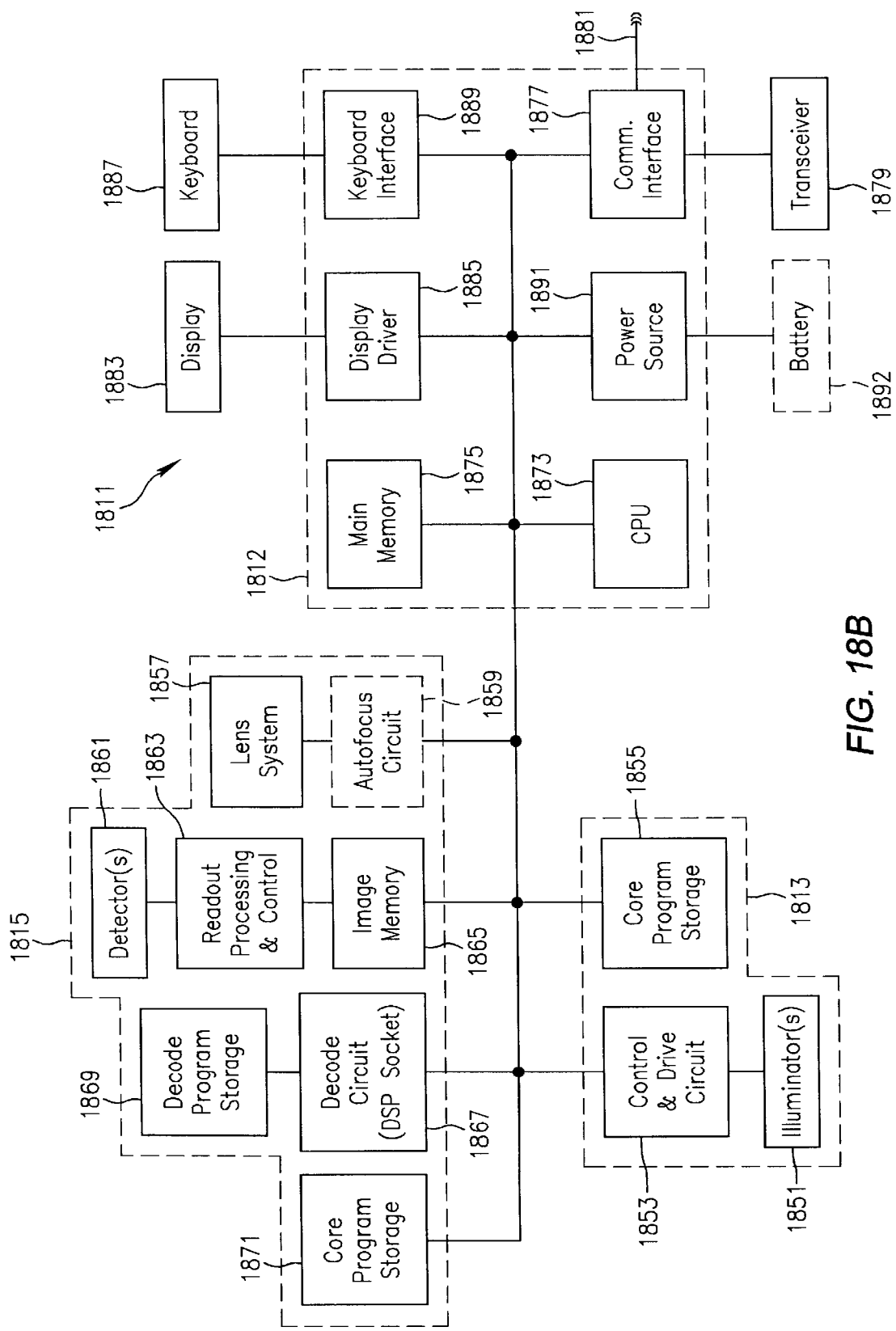

FIG. 18b is a schematic block diagram illustrating one embodiment of the present invention which provides further detail regarding the assemblies identified in FIG. 18a. Control elements 1811 correspond to the control elements of the block 1801 of FIG. 1. Similarly, the illuminator and sensor assemblies of the blocks 1803 and 1805 of FIG. 1 correspond to an illuminator assembly 1813 and a sensor assembly 1815, respectively.

The illuminator assembly 1813 provides an illuminator (or set of illuminators) 1851 mounted on a single PCB ("printed circuit board") with an illuminator control and drive circuit 1853 (as might be required by a given illuminator) and a core program storage means 1855.

The sensor assembly 1815 comprises a lens system 1857 which may have either preconfigured, fixed focal characteristics or autofocus capabilities. If autofocus capabilities are present, an autofocus circuit 1859 controls the lens system 1857 to achieve optimal focus. As with the illuminator assembly 1813, the sensor assembly 1815 also contains a core program storage element, a storage means 1871.

The sensor assembly 1815 further comprises a detector 1861 which receives reflections via the lens system 1857 from a code being illuminated. Upon capturing reflection information, the detector 1861, interacting with a processing and control circuit 1863, delivers the captured information to an image memory 1865. The control elements 1811, interacting as needed with a decode circuit 1867, attempts to decode the reflection information stored in the image memory 1865. When the decode circuit 1867 includes a processing unit such as a DSP ("digital signal processor") a decode program storage means 1869 provides the circuit 1867 instruction regarding decode processing. The decode program storage means 1869 and the image memory 1865 comprise RAM (random access memory).

Because of power requirements and cost of a DSP, multiple sets of decode routines (some requiring a DSP and others avoiding DSP utilization) have been implemented for use with a single sensor assembly. Upgrading to add a DSP is provided via a low insertion force socket that accommodates a DSP should it be added at a future time. For example, without having to incur the cost of the DSP, a user may purchase a code reader having a sensor assembly with an empty DSP socket. Sets of routines for decoding are included which operate with and without the assistance of a DSP. Although without a DSP inserted, certain code types may be read with a certain degree of success. If a DSP is installed, however, other code types might be read and commonly read types might be decoded with higher rates of success.

Moreover, as previously discussed, each set of decode routines and sensor and illuminator combination, constitutes a combination that might be considered for use based on preference. By adding a DSP, either the combinations using the non-DSP set of decode routines are entirely replaced by those requiring DSP's, or combinations requiring both the DSP and non-DSP set of decode routines are used based on ordered preference as described above. In most applications, the latter approach is preferable.

Although the control elements 1811 may constitute a single assembly, more often they will comprise a plurality of assemblies and individually mounted components. As illustrated, the control elements 1811 comprise a PCB 1812, a display 1883, a keyboard 1887, a wireless transceiver 1879 and a battery 1892. On the PCB 1812, a microprocessor 1873 operates as a central processing unit (CPU) for the code reader.

In particular, pursuant to program code stored in a main memory 1875, the microprocessor 1873 exercises control over much of the code reader. For example, the microprocessor 1873 interacts via a communication interface 1877 to establish and maintain wireless communication using the transceiver 1879. Alternately, the communication interface 1877 provides a hard-wired communication link via a connector 1881. In addition, the microprocessor 1873 interacts with the display 1883 (via a display driver 1885) and the keyboard 1887 (via a keyboard interface 1889) to interface with the user. Although not shown, other types of user interfacing might also be implemented if so desired.

A power source 1891 provides power for the entire code reader. In portable configurations, the power source 1891 interconnects with a battery (or plurality thereof) 1892. Such configurations also require the power source 1891 to provide appropriate power regulation and charging functionality. When not in use, the illuminator and sensor assemblies 1813 and 1815 enter a standby (low power) mode although these assemblies receive instruction to do so from the microprocessor 1873, the illuminator and sensor assemblies 1813 and 1815 could independently make such decisions. Similarly, the microprocessor 1873 could as easily provide direct and full control of delivery of power to the assemblies 1813 and 1815.

On powering up the code reader for the first time, the microprocessor 1873 interacting pursuant to code stored within nonvolatile portions of the main memory 1875 begins the initialization process. The microprocessor 1873 initializes the display 1883, keyboard 1887 and transceiver 1879 via the display driver 1885, keyboard interface 1889 and communication interface 1877, respectively. The microprocessor 1873 also initializes the illuminator and sensor assemblies 1813 and 1815.

To initialize the illuminator and sensor assemblies 1813 and 1815, the microprocessor 1873 retrieves information regarding the configurations of the assemblies by reading the core program storage means 1871 and 1855. The microprocessor 1873 also checks to see if the decode circuit is fully enabled, e.g., contains a DSP. At this point, the microprocessor 1873 compares a time stamp stored in the storage means 1871 with a time stamp stored in the storage means 1855. The microprocessor 1873 next extracts a compatibility list from the storage means having the most recent time stamp. From the compatibility list and the known it configurations of the assemblies 1815 and 1813 (previously extracted), the microprocessor 1873 compiles a list of available sensor, illuminator, decode combinations that are compatible.

Ordering based on preference (as previously described) takes place next. Probability factors and power consumption used to compute preferences are extracted from either nonvolatile portions of the main memory 1875 (if previously modified based on actual use and stored there), or the core program storage means (stored as factory defaults). From the preference calculations, the microprocessor 1873 orders the compatible combinations.

Figure 18C:
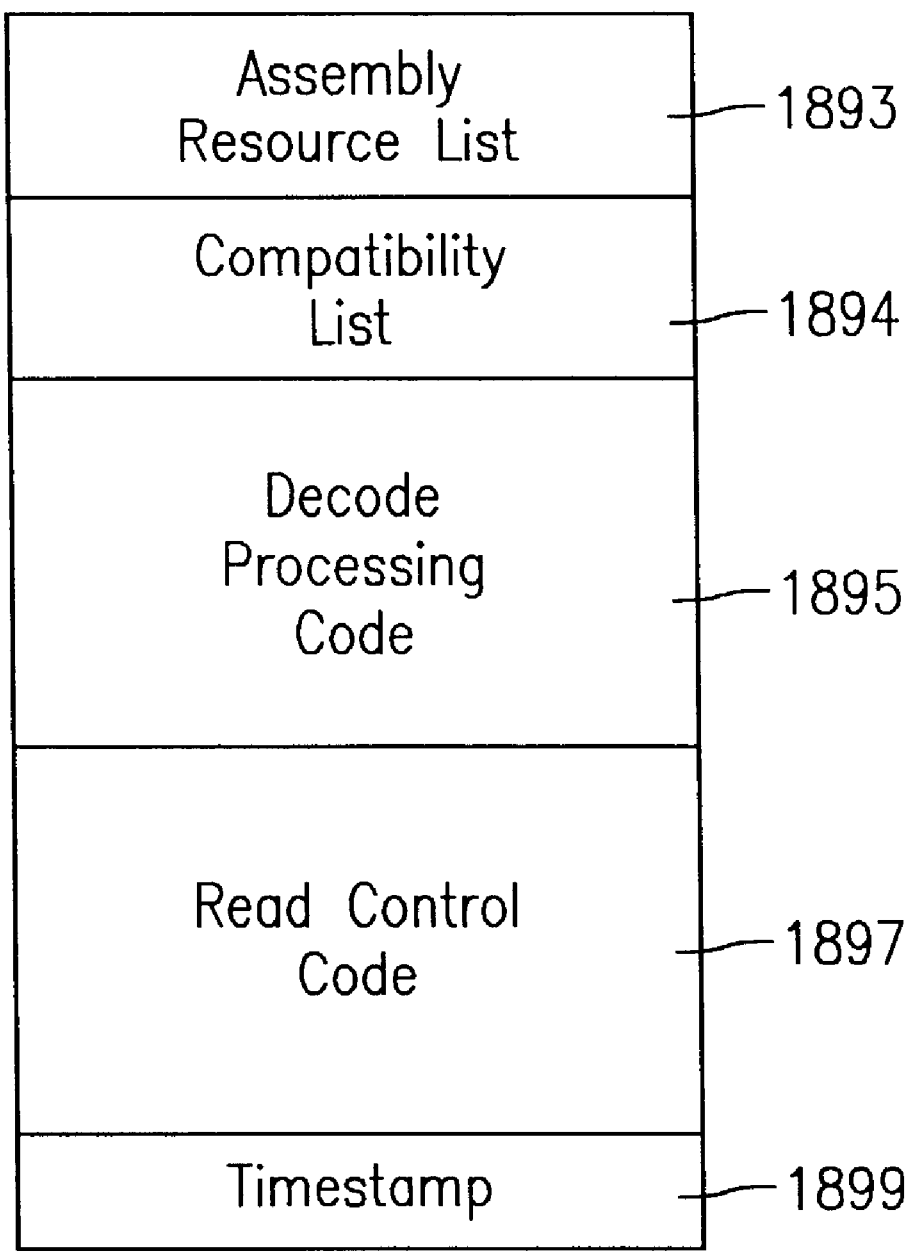
FIG. 18c is a diagram illustrating the memory map of the core program storage means 1855 and 1871 of FIG. 18b.

The microprocessor completes the initialization process by copying from the core program storage means having the most recent time stamp: 1) specific decode processing code into the decode program storage 1869 (if needed); and 2) specific read control code into the main memory 1875. Thus, the decode circuit 1867 utilizes the most recently developed decode processing code during the read attempt with an illuminator (or illuminator combination) that may have never been contemplated when the decode circuit 1867 was first designed. Likewise, the microprocessor 1873 manages the reading process pursuant to the read control code in a manner never contemplated when the code reader was originally designed FIG. 18c is a diagram illustrating the memory map of the core program storage means 1855 and 1871 of FIG. 18b. The information stored in each of the core program storage means 1855 and 1871 is broken into five parts: 1) an assembly resource list 1893; 2) a compatibility list 1894; 3) decode processing code 1895; 4) read control code 1897; and 5) time stamp 1899. Although the storage means 1855 and 1871 comprise ROM (read only memory), any other nonvolatile memory devices might alternately or additionally be used.

As previously detailed, during the initialization of the code reader, the microprocessor 1873 retrieves the assembly resource list 1893 from both the storage means 1855 and 1871. The resource list 1893 in the storage means 1855 identifies the type(s) of illuminator(s) contained in the illuminator assembly 1813 (FIG. 18b). Similarly, the resource list 1893 in the storage means 1871 identifies the decode capability, the type(s) of sensor(s), and autofocus capabilities of the sensor assembly 1815 (FIG. 18b). Where applicable, the microprocessor 1873 also queries the sensor assembly 1815 to determine the level of decode functionality that has actually been installed, e.g., is a DSP in socket.

Also during initialization, the microprocessor 1873 retrieves and compares the time stamp 1899 from each of the storage means 1855 and 1871. The microprocessor 1873 selects the storage means having the most recent time stamp for direct the reading of codes.

The compatibility list 1894 provides a full cross-referenced list of all desirable combinations involving the onboard resources. The compatibility list also provides information needed to perform preference ordering using factory default values. Actual probability data extracted from a user's environment, if available, can be found in the main memory 1875 (FIG. 18b).

The read control code 1897 provides detailed instructions for the microprocessor 1873 regarding how to interact with the available resource combinations in controlling the performance of a read attempt. Although it could operate directly out of the core memory storage means 1855 or 1871, the microprocessor 1873 extracts the read control code 1897 into the main memory 1875 for operation therefrom. The read control code 1897 also includes decode processing routines which are to be performed by (or in part by) the microprocessor 1879.

If no decode processing element is present in the sensor assembly 1815 which requires instructional program code, the decode processing code 1895 need not be included. However, if needed, the decode processing code 1895 is loaded into the decode program storage 1869 for execution by the decode circuit 1867. Thus, depending on the compatible combination selected, decode processing responsibilities may reside solely with the microprocessor 1873, solely with the decode circuit 1867, or with both the microprocessor 1873 and decode circuit 1867. Additionally, to eliminate the need for the decode program storage 1869, the decode circuit 1867 might alternately be configured to operate directly from the decode processing code 1895 stored in either the sensor or illuminator assemblies 1815 or 1813, respectively.

Figure 19A:
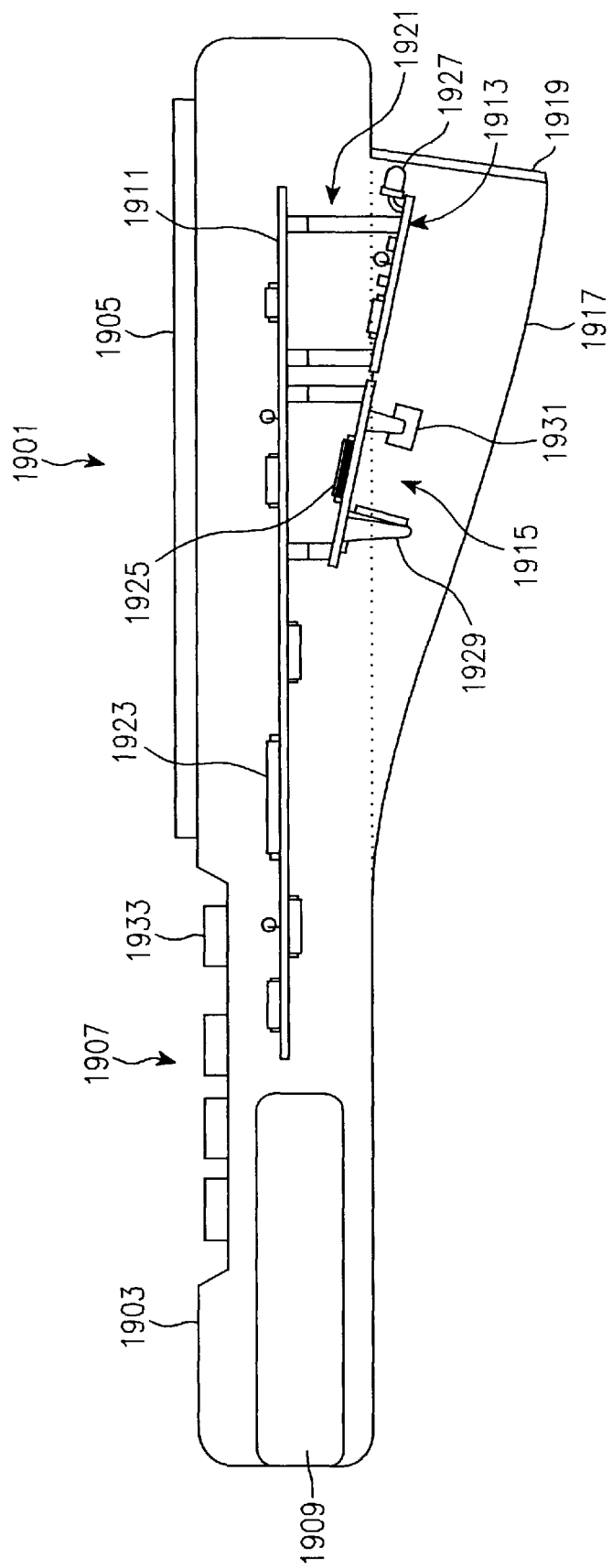
FIG. 19a is a diagram illustrating a cross-sectional view of a tablet-based code reader built in accordance with the present invention which contains the circuitry of FIG. 18b.

FIG. 19a is a diagram illustrating a cross-sectional view of a tablet-based code reader built in accordance with the present invention which contains the circuitry of FIG. 18b. Specifically, a tablet 1901 comprises a hand-held housing 1903 having a display 1905, a keypad 1907 and a battery 1909. The remainder of the control elements are found on a circuit board 1911, which corresponds to the PCB 1812 of FIG. 18b. Similarly, a illuminator assembly 1913 and sensor assembly 1915 (both single circuit boards) correspond respectively to the illuminator and sensor assemblies 1813 and 1815 of FIG. 18b. The illuminator and sensor assemblies 1913 and 1915 are installed via a removable pod 1917. The pod 1917 has a window 1919 through which the illuminator and sensor assemblies 1913 and 1915 interact with a remotely located code to be read. The assemblies 1913 and 1915 achieve optical alignment via mounting connectors 1921 to the circuit board 1911. In addition to providing physical alignment, the mounting connectors 1921 also provide pathways for communicating with the circuit board 1911.

In particular, a microprocessor 1923 initializes the code reader 1901 by initializing the constituent parts. The display 1905 and keypad 1907 are initialized by the microprocessor 1923 via corresponding driver and interface circuitry found on the circuit board 1911. The microprocessor 1923 interacts with core program storage means on both the illuminator and sensor assemblies 1913 and 1915, respectively. Through such interaction, the microprocessor 1923 identifies a LED (light emitting diode) array 1927 as the only available illuminator. The microprocessor 1923 also identifies a single sensor, a 2-D photodetector array 1929, a fixed lens system 1931, and a DSP 1925 in socket. The microprocessor 1923 also loads appropriate read control and decode processing code to conduct the reading process.

Additionally, during the initialization process, the microprocessor 1923 identifies and orders available decode processing, sensor and illuminator combinations. In the illustrated configuration, there is only one illuminator and one sensor. Thus, other compatible combinations depend on the availability of different sets of decode routines. In this instance, there are two sets of decode routines: one requiring the DSP and one that does not. As a factory default, the latter proves to have a higher preference (primarily because of the relatively low power consumption). To complete the initialization process, the microprocessor 1923 directs the assemblies 1913 and 1915 to enter a standby mode.

After initialization, to read a code, a user depresses a read button 1933. The keyboard interface circuit on the circuit board 1911 reports the event to the microprocessor 1925. The microprocessor 1925 responds by causing the illuminator and sensor assemblies 1913 and 1915 to exit the standby mode and begin a read attempt using the first set of decode routines (not requiring the DSP).

The illuminator assembly 1913 responds by turning on the LED array 1927 to illuminate a code outside the window 1919. The reflection from the code returns through the window 1919 and the fixed lens system 1931 to the photosensor array 1929. The photosensor array 1929 captures a 2-D image of the code, and stores the image in a image memory on the sensor assembly 1915.

The DSP 1915 remains powered down during the first decode attempt. Following the first set of decode routines, the microprocessor 1923 retrieves the 2-D image from the sensor assembly 1915, and attempts to decode the image. The first set of decode routines operate under the assumption that the image is a 1-D code, attempting angular stitching of the image. If the stitching fails or the microprocessor determines that the image is a 2-D code, the microprocessor 1923 causes the DSP 1915 to take over.

Pursuant to the second set of decode routines, the DSP 1915 responds by attempting to decode the image stored in the image memory on the sensor assembly 1915. If the DSP 1925 fails to decode the image, the microprocessor 1923 might direct another read attempt, else indicates to the user the failed attempt. Similarly, if the decode processing proves successful, the microprocessor 1923 indicates to the user the success of the read. In addition, the microprocessor 1923 uses the current results to modify the probabilities used in future preferences calculations.

Figure 19B:
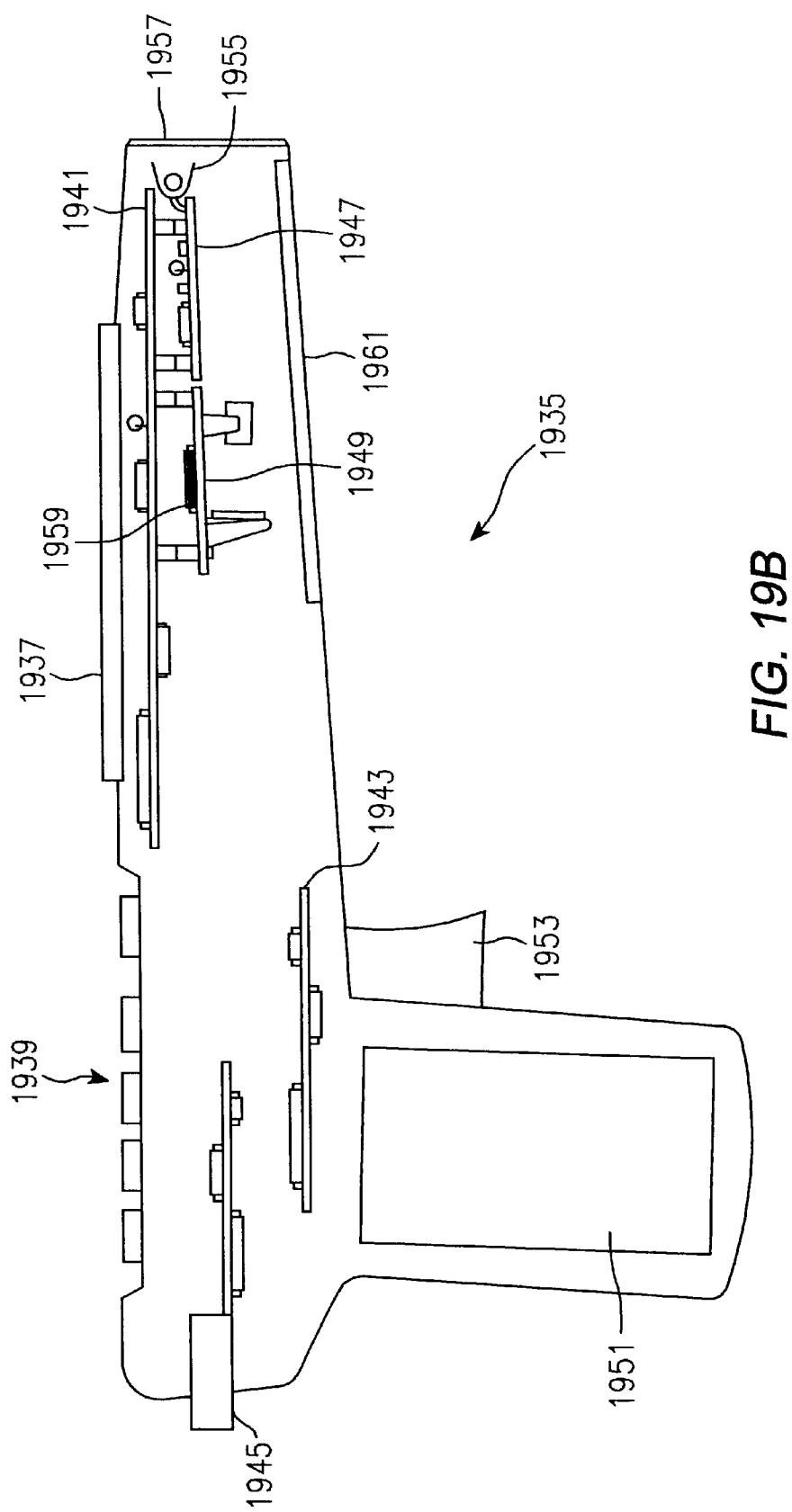
FIG. 19b is a cross-reference diagram illustrating a second embodiment of a code reader built in accordance with the present invention.

FIG. 19*b* is a cross-reference diagram illustrating a second embodiment of a code reader built in accordance with the present invention. In particular, a gun-shaped code reader 1935 operates as described above in relation to FIGS. 18*b* and 19*a*. The code reader 1935 comprises a display 1937, a keypad 1939 and a battery 1951. The remaining control elements are distributed between a main circuit board 1941, a power management board 1943 and a wireless transceiver board 1945. The code reader 1935 also accepts an illuminator assembly 1947 and sensor assembly 1949 (both single circuit boards).

The sensor assembly 1949 is similar to that illustrated in the code reader 1901 of FIG. 19*a*. The illuminator assembly 1947 utilizes a flash device 1955 having a parabolic mirror for directing the illumination through a window 1957 to codes positioned in front of the code reader 1935.

The microprocessor of the code reader 1935 performs initialization as described above in reference to FIG. 19*a*. However, instead of having two compatible combinations, the illustrated code reader 1935 has only one. This results from the lack of two sets of decode routines placed in use. That is, only a single set of decode routines is available which uses a DSP 1959 to conduct the majority of the decode processing.

To initiate a read attempt, a user need only depress a trigger 1953. In addition, a panel 1961 provides access to change the illuminator and/or sensor assemblies 1947 and 1949.

Figure 19C:
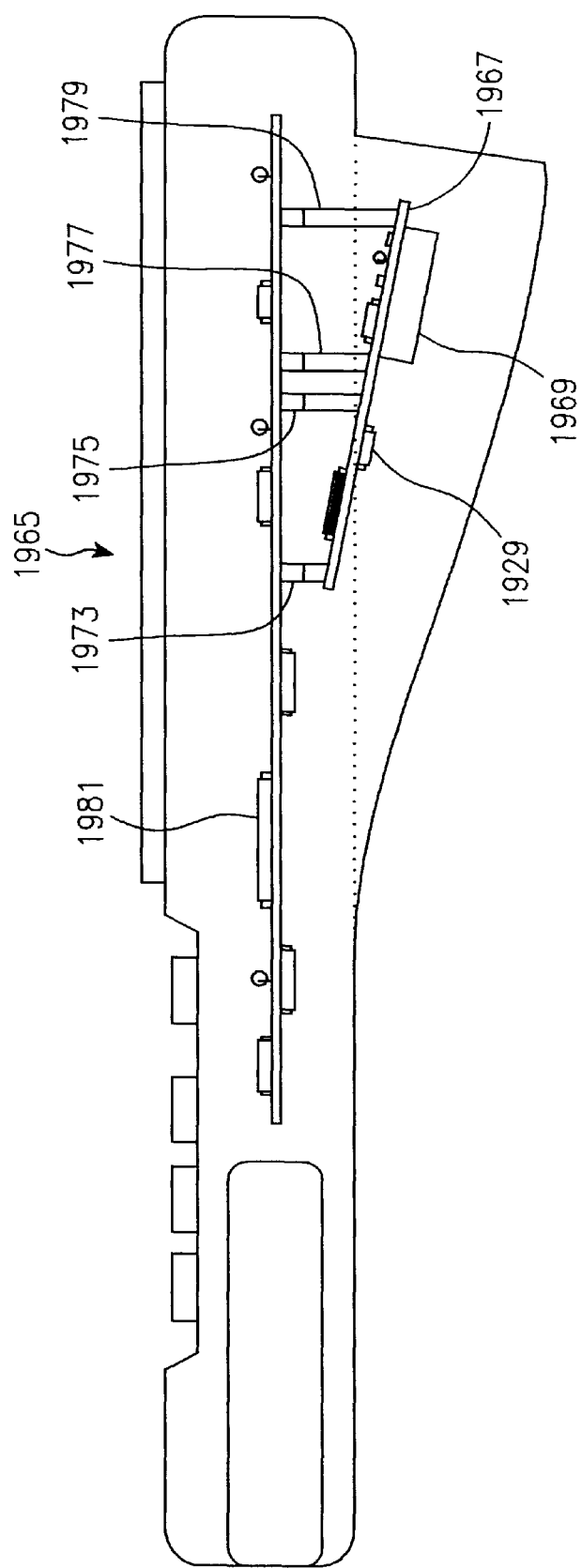
FIG. 19c is a cross-sectional diagram illustrating a further embodiment of the present invention in which the illuminator and sensor assemblies have been combined into a single removable assembly.

FIG. 19*c* is a cross-sectional diagram illustrating a further embodiment of the present invention in which the illuminator and sensor assemblies have been combined into a single removable assembly. A tablet-based code reader 1965 is configured substantially as described in reference to FIG. 19*a*. However, a single assembly 1967 is provided in place of the separate illuminator and sensor assemblies. The single assembly 1967 permits other types of interworking sensor, lens system and illuminator combinations to be collocated for further optical alignment or combined scanning motion, for example.

A sensor, lens system and illuminator component 1969 is located at the front of the assembly 1967. Connectivity to a microprocessor 1981 for the sensor portion of the assembly flows through connectors 1973 and 1975. Similarly, connectivity for illuminator portion flows through the connectors 1977 and 1979. Thus, the microprocessor 1981 need not know that the illuminator and sensor assemblies have been combined.

Figure 19D:
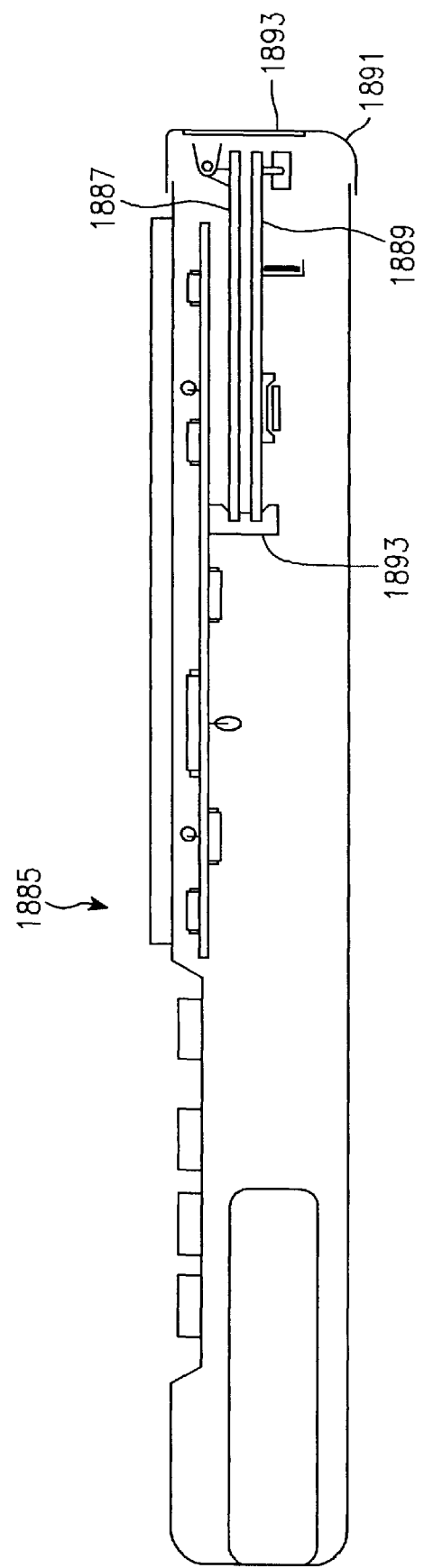
FIG. 19d is a cross-sectional diagram illustrating another embodiment of a tablet-based code reader 1885 built in accordance with the present invention.

For example, instead of requiring two core program storage means, the assembly 1967 only provides a single storage means 1971. However, the storage means 1971 is mapped to two addresses: the address of the storage means normally on the illuminator assembly; and the address of the storage means normally on the sensor assembly. In addition, all control interfacing with the microprocessor 1981 remains the same whether the single assembly 1967 or two assemblies are used. Thus, the microprocessor 1981 need not know that the assemblies have been combined FIG. 19*d* is a cross-sectional diagram illustrating another embodiment of a tablet-based code reader 1885 built in accordance with the present invention. The reader 1885 is identical to that illustrated and described in reference to FIG. 19*a* above with few exceptions. The differences lie in the utilization of PCMCIA cards for mounting the illuminator and sensor assemblies. In particular, the illuminator and sensor assemblies of FIG. 19*a* correspond to illuminator and sensor PCMCIA cards 1887 and 1889.

An end-cap 1893 having a window 1893 can be opened to insert or replace either or both of the cards 1887 and 1889, via the PCMCIA connector 1893. Alternately, if code reading is not required, the PCMCIA connector 1893 can be used to accept other types of PCMCIA cards such as PCMCIA based modems, transceivers, flash cards, hard drives, etc.

By installing the illuminator and sensor PCMCIA cards 1887 and 1889, the PCMCIA slot and connector 1893 provides optical alignment between the cards 1887 and 1889. Moreover, the illuminator assemblies might also be combined into a single PCMCIA card (as described above in reference to FIG. 19c). Such a combination would free up one of the PCMCIA slots so that it may be used for other purposes. To function appropriately however, the read control code loaded requires that the microprocessor 1885 coordinate all illuminator and sensor control through the a single slot on the PCMCIA connector 1893.

Figure 20A:
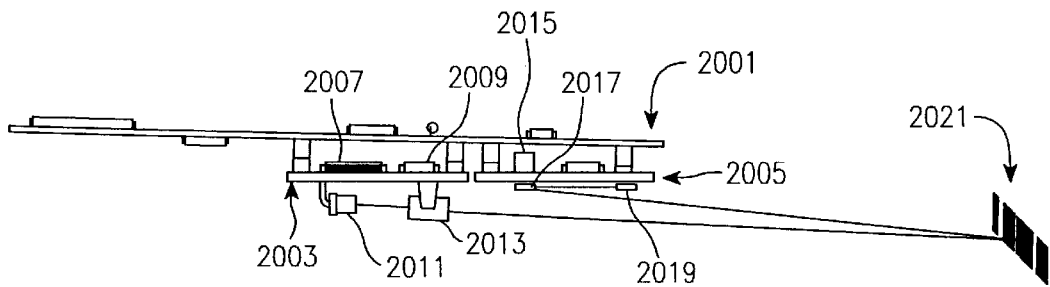
FIGS. 20a–c are diagrams illustrating a side views of several exemplary code reader assemblies built in accordance with the present invention. In particular.
Figure 20B:
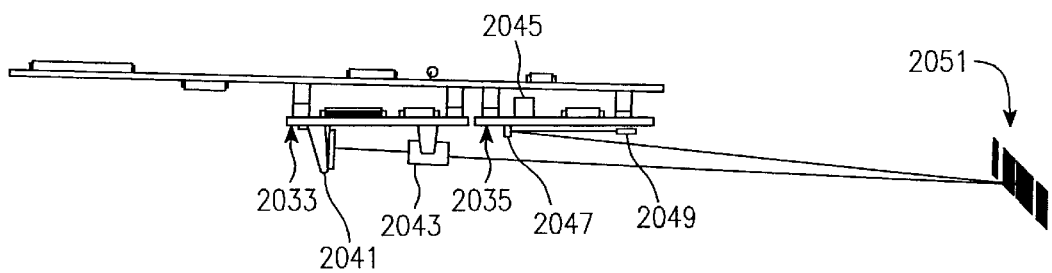
Figure 20C:
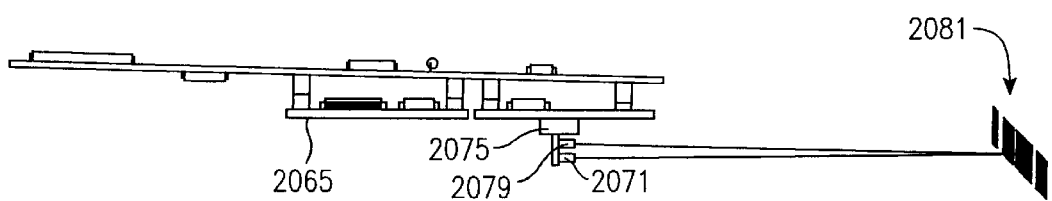

FIGS. 20a–c are diagrams illustrating a side views of several exemplary code reader assemblies built in accordance with the present invention. FIG. 20a illustrates a main circuit board 2001 comprising much of the control elements described, for example, in FIG. 18a. A sensor assembly 2003 consists of a printed circuit board which comprises decode circuitry including a DSP 2007, decode program storage (not shown) and core program storage 2009. The sensor assembly 2003 also contains image memory (not shown), sensor control circuitry (not shown), a photodetector 2011 and a fixed focus lens assembly 2013. In addition, an illuminator assembly 2005 comprises a motor 2015 which spins an octagonal mirror 2017 to scan a laser light output of a laser diode 2019 across a code 2021.

FIG. 20b illustrates the replacement of the illuminator and sensor assemblies. Much like the illuminator assembly 2005 of FIG. 20a, an illuminator assembly 2035 has a motor 2045 which rocks a mirror 2017 back and forth to scan a laser light output of a laser diode 2049 across a code 2051. A fixed focus lens system 2043 directs reflected laser light toward a 2-D photodetector array 2041 for capture and decoding.

FIG. 20c illustrates yet another embodiment of the code reader assemblies wherein a single assembly 2065 is provided for both illuminator and sensor mounting. As shown, a motor 2075 oscillates to scan laser light from a laser diode 2079 across a code 2081. A photodetector 2071 is also oscillated along with the laser diode 2079 so as to aim the photodetector 2071 at the portion of the code being illuminated by the laser light.

Although only a single set of decode routines might be used with the illuminator and sensor combinations illustrated in FIGS. 20a–c, with a DSP installed, there are preferably two—one using the DSP and one without the DSP. Moreover, although not illustrated, many other types of single illuminator and single sensor assemblies can be used.

Figure 21A:
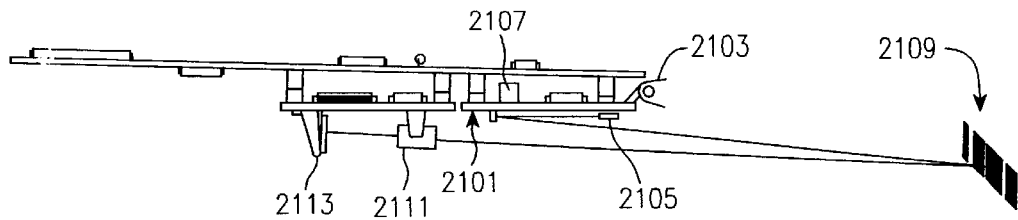
FIGS. 21a–d are diagrams illustrating several exemplary embodiments of the present invention wherein multiple illuminators are employed in a single illuminator assembly.

FIGS. 21a–d are diagrams illustrating several exemplary embodiments of the present invention wherein multiple illuminators are employed in a single illuminator assembly. FIG. 21a illustrates an illuminator assembly 2101 having both a flash illuminator 2103 and a laser diode 2105. The laser diode 2105 directs a laser beam toward an oscillating mirror attached to a motor assembly 2107. The mirror scans the laser light across a code 2109. Scanned reflections from the code 2109 are received via a lens system 2111 by a photodetector array 2113. Similarly, the photodetector array 2113 receives reflections from the code 2109 originating from the flash illuminator 2103.

As described in more detail above, the code reader performs preference ordering of compatible sensor, illuminator and decode routine combinations. In FIG. 21a, there are two compatible combinations, although other combinations might have been implemented by adding additional sets of decode algorithms. One compatible combination involves the use of the laser diode 2105 (the illuminator) with the photodetector array 2113 (the sensor) pursuant to a first set of decode routines not involving the use of a DSP. As is well known in many laser scanning code readers, such a combination effectively reads 1-D bar codes over a wide range with reasonable accuracy.

For rather damaged 1-D bar codes or 2-D codes, the combination with the laser diode 2105 proves unsatisfactory. Thus, a second combination involves the use of the flash illuminator 2103 with the photodetector array 2113 and a second set of decode routines that require DSP assistance. With the second combination, damaged 1-D bar codes are stitched together for higher decode accuracy, and 2-D codes are fully illuminated for capture and decoding.

From initial factory default settings, preference calculations direct the use of the laser diode 2105 combination first, followed by the flash illuminator 2103 combination should the first combination fail. However, if through use the first combination fails very often with a successful second combination read attempt, preference calculations by the code reader will direct an order reversal, i.e., the flash illuminator 2103 combination being used first with the laser diode 2105 combination begin used only as a backup.

Figure 21B:
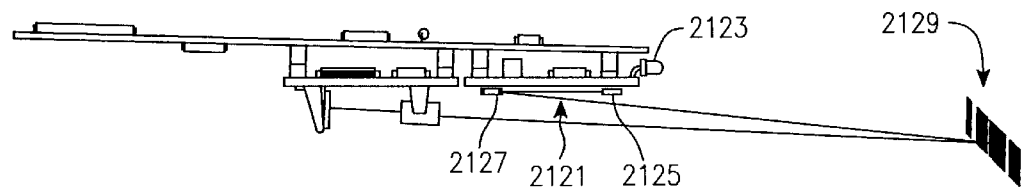

FIG. 21b illustrates a code reader configuration wherein an illuminator assembly 2121 contains both a laser diode 2125 and a diffused LED (light emitting diode) array 2123. This exemplary configuration operates as described above in reference to the configuration of FIG. 21a. The only difference being the use of the diffused LED array 2123 instead of the flash device 2103 (FIG. 21a).

Figure 21C:
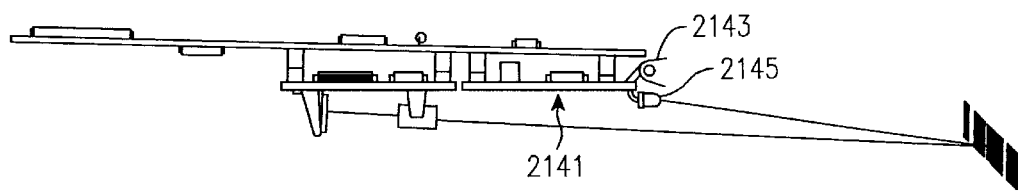

FIG. 21c illustrates another exemplary code reader configuration wherein the illuminator assembly 2141 comprises a flash illuminator 2143 and a diffused LED array 2145. Although both of the available illuminators utilize similar decode routines with similar decoding results, the flash illuminator 2143 provides more intense illumination at higher levels of energy consumption. Thus, from factory default settings, preference calculations direct the use of the diffused LED array 2145 first with the flash illuminator 2143 acting as a backup. However, should actual use indicate the need, the preference order will be reversed.

Figure 21D:
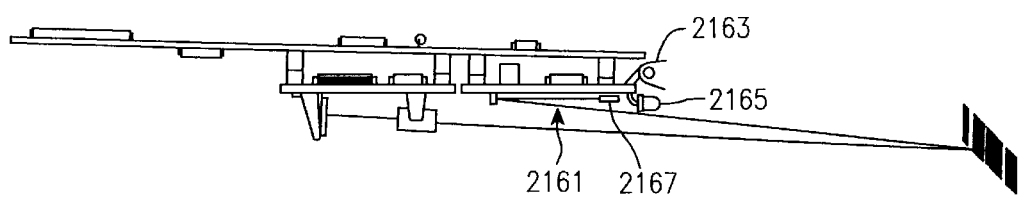

FIG. 21d illustrates yet another exemplary configuration of a code reader built in accordance with the present invention wherein three types of illuminators are included in an illuminator assembly 2161. Specifically, factory default preference directs the use of a laser diode 2167 during the first read attempt. Thereafter, should the attempt fail, the code reader uses a diffused LED array 2165 to reattempt the read. Should the second read attempt fail, the code reader uses a flash illuminator 2163. Again, preference ordering will change based on actual code reading results.

Although not shown, sensor assemblies each having multiple sensors ("multiple sensor assemblies") and other multiple illuminator assemblies might also be implemented. The FIGS. 21a–d are merely illustrative examples of several possibilities.

Figure 22:
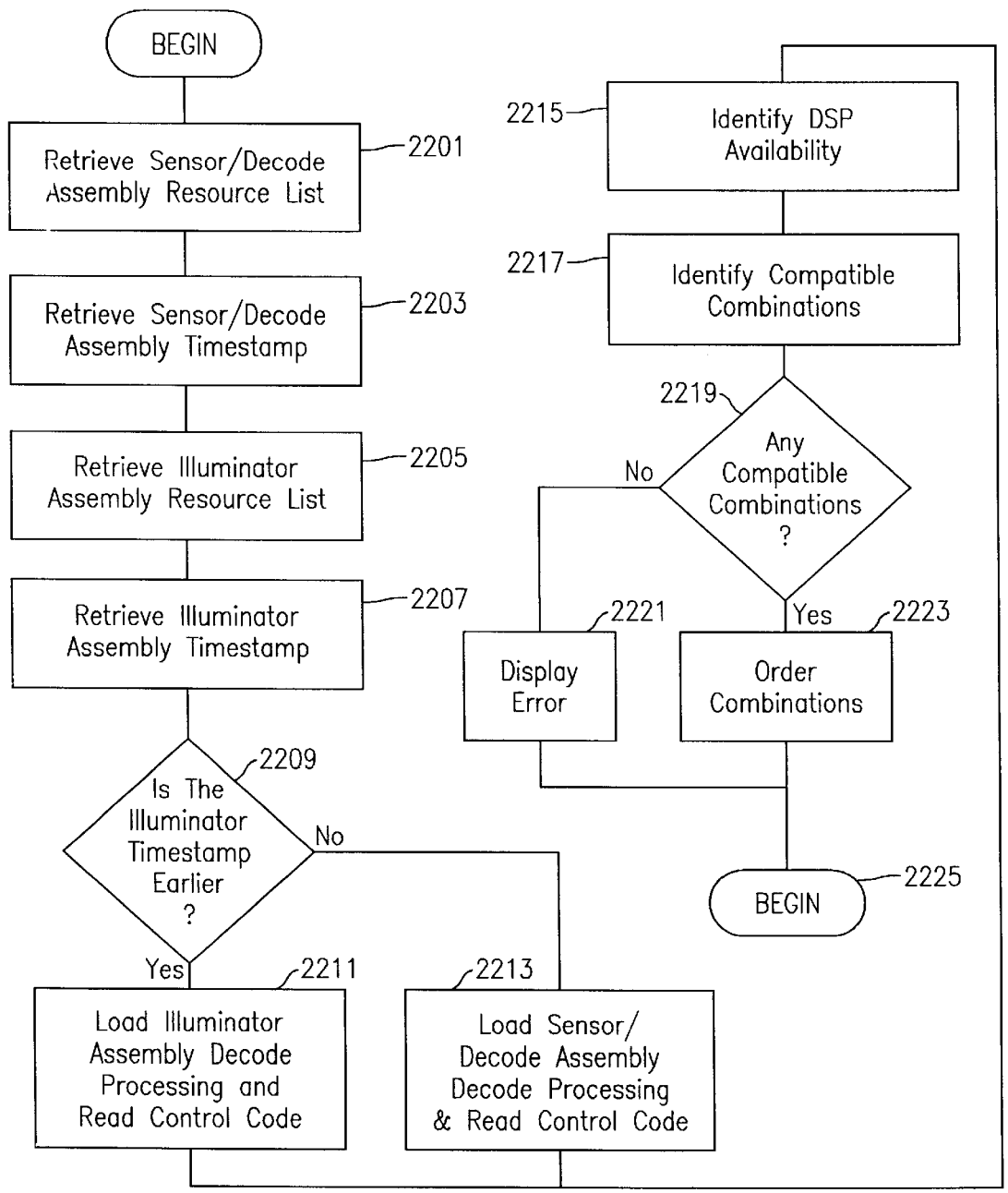
FIG. 22 is a flow diagram illustrating the functionality of a microprocessor within a code reader, such as described above in reference to FIG. 18b, during code reader initialization.

FIG. 22 is a flow diagram illustrating the functionality of a microprocessor within a code reader, such as described above in reference to FIG. 18b, during code reader initialization. In particular, upon power up, the microprocessor begins the initialization process by retrieving a resource list from a core program storage means on the sensor assembly at a block 2201. The resource list identifies the sensor or sensors, lens system and decode processing capability within the sensor assembly. The resource list also contains compatibility information and associated default probabilities and power consumption information used in performing preference calculations ("preference information"). The microprocessor also retrieves a time stamp from the core program storage means of the sensor assembly at a block 2203.

Similarly, the microprocessor the microprocessor retrieves a resource list, at a block 2205, and a time stamp, at a block 2207, from a core program storage means on the illuminator assembly. This resource list identifies the types of illuminators available along with associated compatibility and preference information.

At a block 2209, the microprocessor compares the illuminator and sensor assembly time stamps. If the time stamp from the illuminator assembly is earlier, the microprocessor extracts decode processing and read control code from the core program storage means of the illuminator assembly at a block 2211. Otherwise, at a block 2213, the microprocessor extracts such code from the core program storage means of the sensor assembly. Either way, the extracted read control code is loaded into main memory used by the microprocessor, while the extracted decode processing code is loaded into decode program storage maintained by the sensor assembly.

Afterwards, at a block 2215, the microprocessor queries the sensor assembly to identify whether a DSP has been installed. With the resources and preference information gathered, the microprocessor utilizes compatibility information from the most recently time stamped resource list to identify all possible, compatible combinations of sensors, illuminators and sets of decode routines at a block 2217.

If no combinations are compatible, as identified at a block 2219, an error condition is displayed reporting the mismatch. Otherwise, the compatible combinations (if more that one) are ordered using preference calculations at a block 2223. Preference information associated with the most recent time stamp governs any conflicts encountered. Thereafter, the initialization process ends at a block 2225, and the code reader awaits a read attempt.

Figure 23:
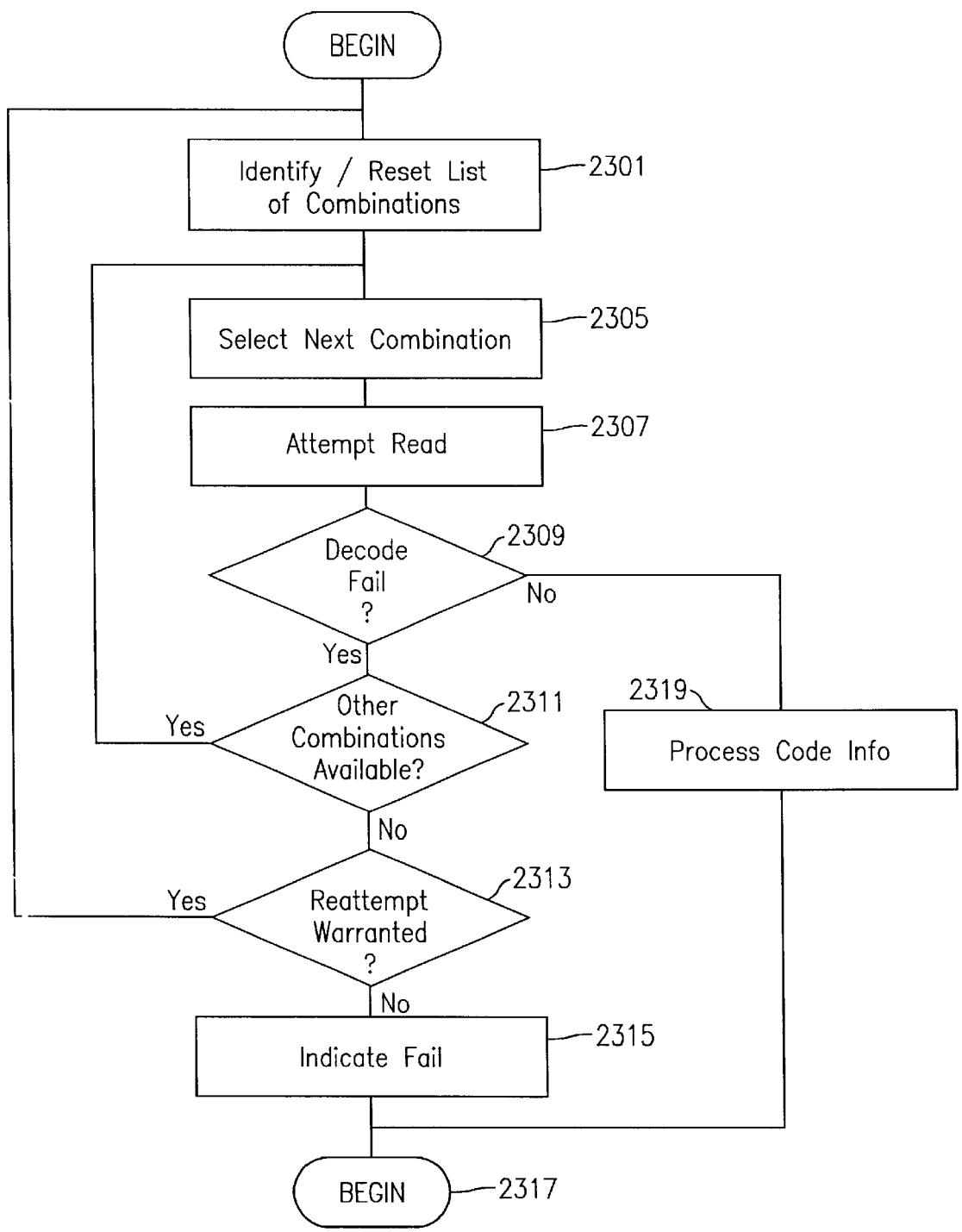
FIG. 23 is a flow diagram illustrating the functionality of a microprocessor of a code reader upon encountering a read attempt.

FIG. 23 is a flow diagram illustrating the functionality of a microprocessor of a code reader upon encountering a read attempt. In particular, after ending the initialization process described in reference to FIG. 22, a microprocessor begins the read processing of FIG. 23 upon detecting a read attempt. At a block 2301, the microprocessor identifies the ordered list of compatible sensor, illuminator and decode combinations generated previously based on preference calculations. At a block 2305, the first combination is selected, and with that selection a read is attempted at a block 2307. The specifics regarding the read attempt are governed by the read control code and the decode program code extracted from the most recent core program storage means, as previously described.

If the read attempt succeeds, the microprocessor processes the code information at a block 2319, ending the process and awaits another read attempt. Otherwise, if the read attempt fails, the microprocessor branches from a block 2309 to a block 2311 to attempt the read with another sensor, illuminator and decode combination.

If another compatible combination exists that has not yet been attempted, the microprocessor branches and selects the next combination at the block 2305. As before, the selection is based on preference ordering. With the next combination, the read is reattempted at the block 2307. With success, the code information is processed and the reading process ends. Otherwise, if the read attempt fails, the cycle is repeated until either all compatible combinations have failed or a successful read has occurred.

If all combinations have failed, the microprocessor considers whether to reattempt the entire process another time at a block 2313. If warranted, the microprocessor branches back to the block 2301 to begin again. If the entire reattempt is not warranted, the microprocessor branches to a block 2315 to indicate a fail condition, ending the read attempt.

In some embodiments, the decision at the block 2313 is based on the specific compatible combinations being used. In others, the decision is governed by the desired characteristics of read triggering. For example, in one setup configuration, a reattempt is warranted when a trigger is held in a depressed state. To save battery power, in an alternate setup configuration, no reattempt is warranted regardless of the trigger state. Similarly, for example, a code reader that uses proximity as a trigger can operate in either setup configuration.

Moreover, the flow diagrams of FIGS. 22 and 23 provide only one example of how a code reader built in accordance with the present invention might function. Thus, it should be clear that many other variations to the flow diagrams are possible while still remaining within the scope of the present invention.

FIGS. 24a–d are diagrams illustrating an alternate embodiments of the present invention in which the DSP circuitry needed for decode processing is centrally located as a shared resource for assisting other code reader processing. In a tablet-based code reader, there are several justifications for adding a DSP and associated circuitry. For example, DSP processing offers advantages in audio and video processing, communication processing (such as with various compression/decompression and encryption/decryption techniques), real-time control applications and decode processing of code images (as detailed above), to name but a few. However, instead of adding numerous DSP devices and circuitry, the embodiments of the present invention illustrated in FIGS. 24a–d use only one.

Figure 24A:
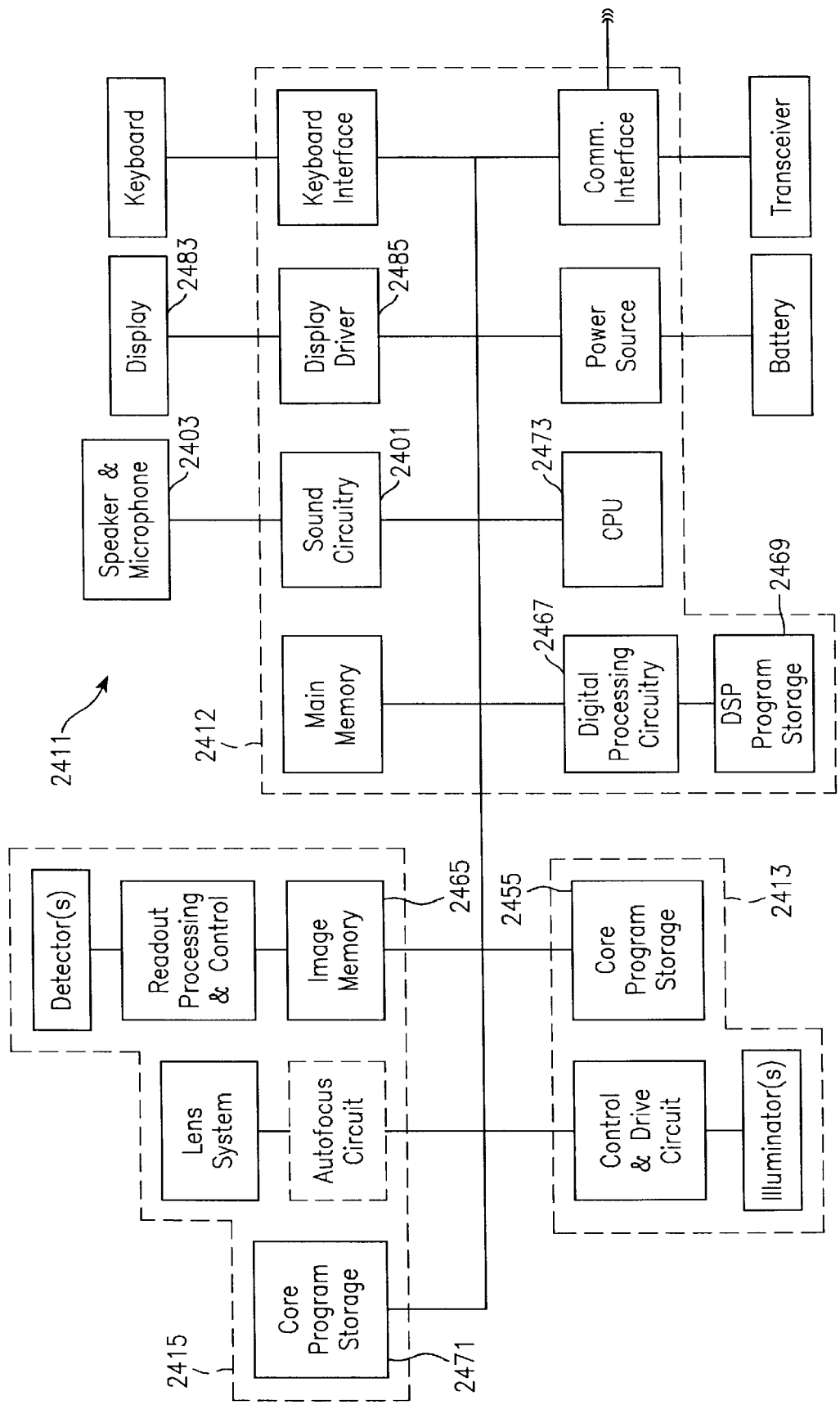
FIG. 24a is a schematic block diagram which illustrates the differences between the embodiment of FIG. 18b in providing a shared DSP resource.

FIG. 24a is a schematic block diagram which illustrates the differences between the embodiment of FIG. 18b in providing a shared DSP resource. Generally, the illustrated embodiment operates as described previously in reference to FIG. 18b above, and, therefore, need not be repeated.

FIG. 24a differs from FIG. 18b in that the decode circuit 1867 and associated program storage means 1869 have been relocated from the sensor assembly 1815 to the main (mother) board, the PCE 1812 (see FIG. 18b). In particular, the code reader of FIG. 24a comprises an illuminator assembly 2413, a sensor assembly 2415 and various control elements 2411.

The illuminator assembly 2413 corresponds directly with the illuminator assembly 1813 of FIG. 18b with no difference in functionality. The sensor assembly 2415 differs from its counterpart in FIG. 18b in that the decode circuit 1867 and decode storage means 1869 have been incorporated into a mother board 2412 as a digital processing circuit 2467 and a DSP program storage means 2469, respectively.

Thus, to use the digital processing circuit 2467 (which includes a DSP), a microprocessor 2473 (one possible type of central processing unit or CPU) must first load the DSP program storage means 2469 with code that governs the desired processing. For example, to utilize the digital processing circuit 2467 during a read attempt, the microprocessor 2473 extracts the decode processing code from a core program storage means 2455 or 2471 (based on the latest time stamp), and loads that code via the digital processing circuit 2467 into the program storage means 2469. Thereafter, to decode an image, the microprocessor 2473 directs the digital processing circuit 2467 to operate on a captured image stored in an image memory 2465 pursuant to the program code in the storage means 2469.

Similarly, to conduct voice sampling, the microprocessor 2473 loads the DSP program storage means 2469 with sound processing code. Thereafter, via a sound circuit 2401, the processing circuit 2467 interacts with a speaker and microphone 2403 to provide audio processing as can be found in conventional audio boards. Likewise, the microprocessor 2473 can load the program storage means 2469 for cooperative functionality with a display 2483 via display driver 2485 to perform video or graphics processing. Such cooperative interaction is achieved with a communication interface 2477 for performing data compression and decompression.

Figure 24B:
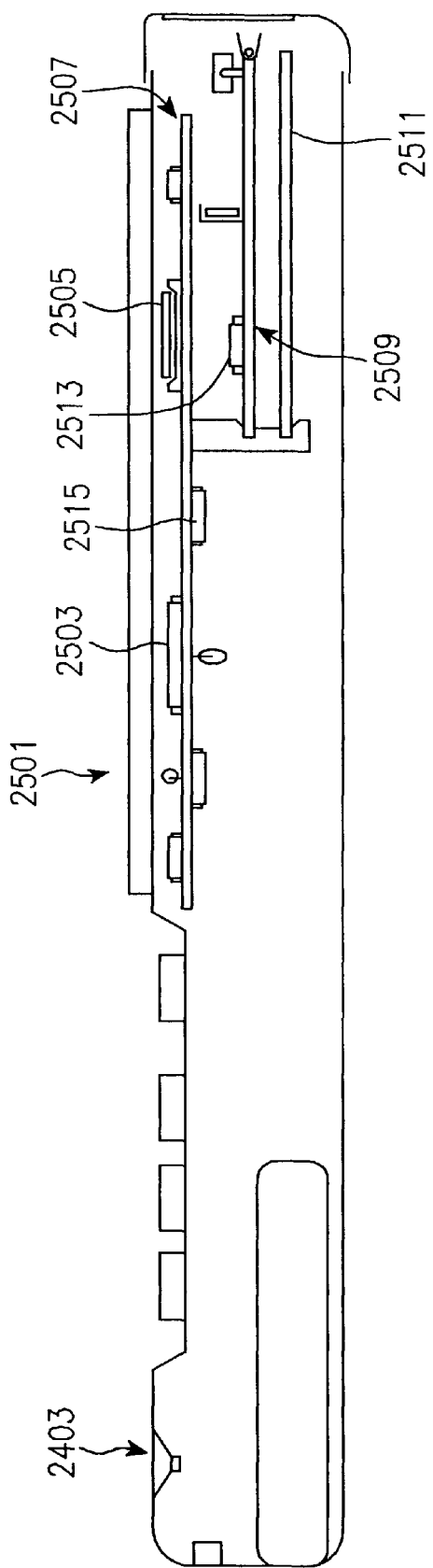
FIGS. 24b–d illustrate specific applications of the circuitry of FIG. 24a according to the present invention.
Figure 24C:
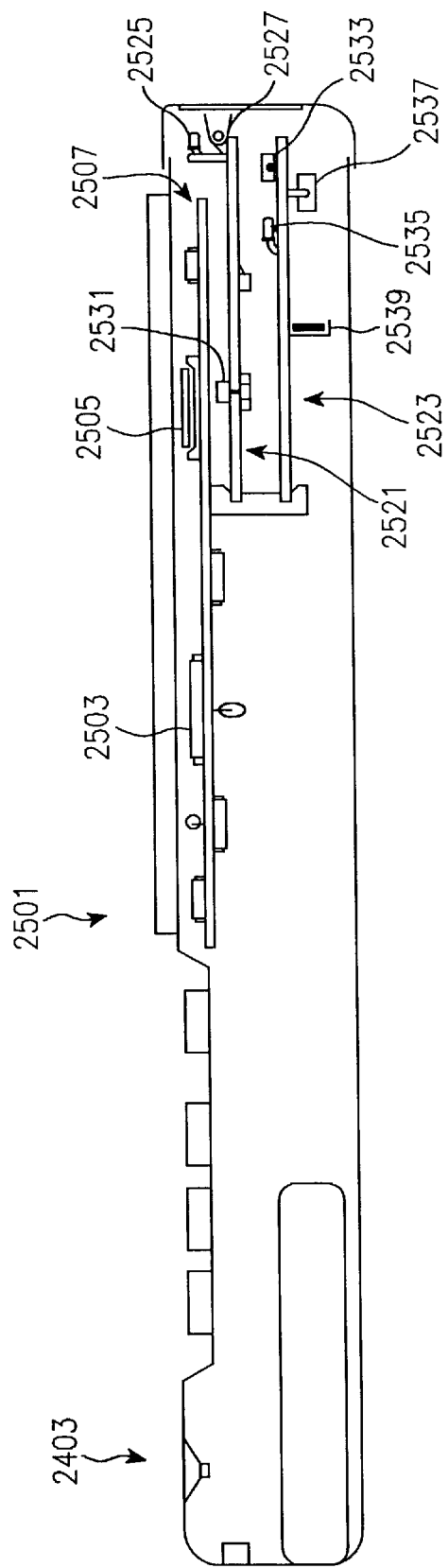
Figure 24D:
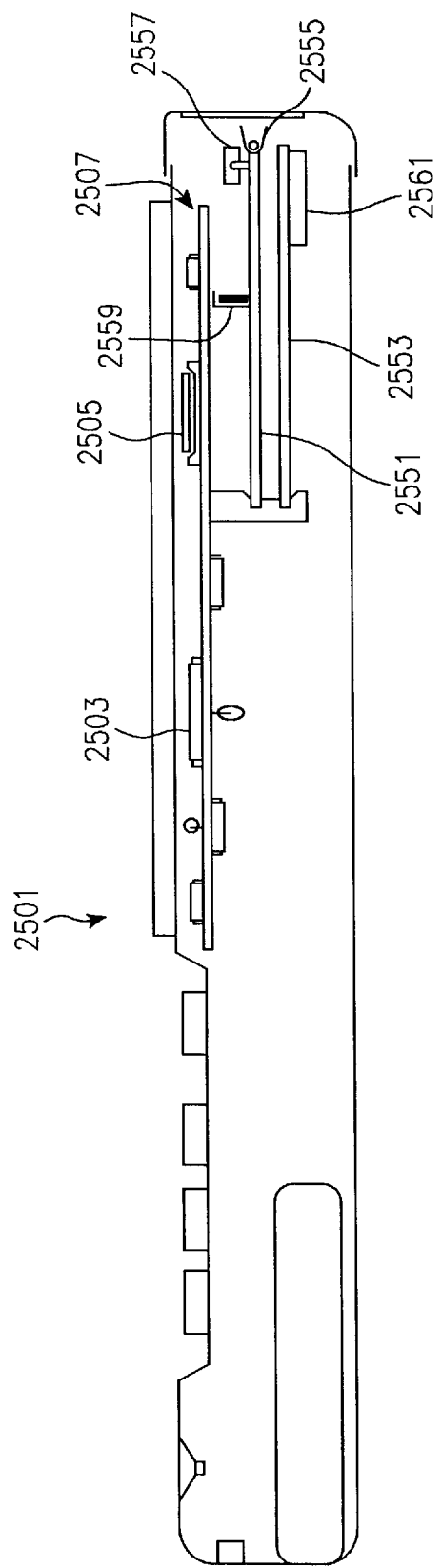

FIGS. 24b–d illustrate specific applications of the circuitry of FIG. 24a according to the present invention. FIG. 24b illustrates a tablet-based code reader 2501 having a microprocessor 2503 and a DSP 2505 on a mother board 2507. Instead of two distinct illuminator and sensor assemblies, the present embodiment illustrates the use of a single PCMCIA based combined assembly, an illuminator/sensor assembly 2509. The other PCMCIA slot may be used by any other card such as a wireless modem 2511 which may share all of the resources on the mother board 2507, including the DSP 2503.

A core program storage means, read only memory (ROM) 2513, provides all initialization and decode information needed to perform a reading operation. Such initialization information includes the sets of decode routines, i.e., the decode program code, that the microprocessor 2503 loads into a DSP program means—random access memory (RAM) 2515. Similarly, the microprocessor 2503 loads DSP program code for sound and video processing functionality and for any functionality required by the wireless modem 2511 (in this embodiment such functionality would include routines for performing compression/decompression).

FIG. 24c illustrates another configuration of the tablet-based code reader of FIG. 24b. As before, the code reader 2501 shares both the microprocessor 2503 and DSP 2505 on the mother board 2507 for many purposes such as sound and video processing, etc.

In addition, the code reader 2501 is configured with independent, PCMCIA based illuminator and sensor assemblies, i.e., an illuminator assembly 2521 and a sensor assembly 2523. The illuminator assembly 2521 contains a pair of diodes 2525 for determining the distance to a code and cooperating therewith a flash illuminator 2527. The illuminator assembly 2521 also contains a laser diode 2529 which operates with an octagon shaped mirror and motor assembly 2531 to scan a laser beam across a code.

The sensor assembly contains a photodetector 2535 which receives reflected light via a first lens system 2533, and a photodetector array 2539 which receives light via a second lens system 2537.

Unlike previous configurations, the present illuminator/sensor configuration enables a more integrated operation. Specifically, in the illustrated embodiment, there are two compatible combinations, although many other combinations might be used. One combination involves the laser diode 2529 as the illuminator and the photodetector 2535 as the sensor along with a decoding process which does not require the use of the DSP 2505. The second combination involves the use of the flash illuminator 2527 and the photodetector array 2539.

Instead of being used in sequence as described in reference to it the embodiments above, the two compatible sensor, decode and illuminator combinations are used in parallel. In particular, to begin a read attempt, the microprocessor 2503 causes the laser diode 2529 and the motor assembly 2531 to deliver and scan a laser beam across a code to be read. In response, the photodetector 2535 receives reflections of from the code through the lens system 2527. As the code is scanned, the output of the photodetector 2535 is processed using conventional methods. Periodically, the microprocessor causes the laser diode 2529 to turn off for a brief period of time during which the diodes 2525 are turned on. While the diodes 2525 are on, the photodetector array 2539 is used to capture the reflected image. Thereafter, the image is loaded into image memory storage, the diodes 2525 are turned off, and the laser diode 2529 is turned back on to continue the scanning. By evaluating the image created by the diodes 2525 as described above, use of the flash device 2527 can be timed for application when the appropriate focal distance has been reached.

Thus, while the laser diode 2529 based illuminator is used in a decode attempt with the photodetector 2535, the diodes 2525 cooperate with the photodetector array 2539 to arrange for a flash event. If the laser diode 2529 combination proves successful prior to the first turn off period, the read attempt ends without ever requiring the use of the diodes 2525, flash illuminator 2527 or the photodetector array 2539. If the laser diode 2529 combination proves successful after utilizing the diodes 2525 and photodetector array 2539 but prior to the use of the flash illuminator 2527, the read attempt immediately ends. Otherwise, if analysis of the image memory indicates that an appropriate distance has been reached, the laser diode 2529 is turned off and the flash illuminator 2527 fires (flashes).

The reflection from the flash illuminator 2527 is captured by the photodetector array 2539 and stored in image memory for decode processing. Thereafter, the laser diode 2529 combination is turned back on to continue to successfully conclude the read attempt. At this point, if either combination results in a successful read, the reading process ends with success. Otherwise, the laser diode 2529 combination is periodically turned off then on to permit interspersed read reattempts by the flash illuminator 2527 combination. If after repeated attempts the flash illuminator 2527 fails to read the code, read attempts from both combinations are stopped, and the read attempt is classified as a failure.

Moreover, because only one of the compatible combinations requires the use of the DSP 2505, time sharing of resources during decode processing is minimized. Even so, by using a time sharing arrangement, both combinations could utilize the DSP 2505 if so desired.

FIG. 24d illustrates yet another exemplary configuration of the tablet-based code reader 2501 of FIG. 24b–c. As before, the code reader 2501 shares both the microprocessor 2503 and DSP 2505 on the mother board 2507 for many purposes such as sound and video processing, etc. However, the code reader 2501 has been configured with two PCMCIA cards which each contain a combination of a sensor, decode circuitry and illuminator.

In particular, the code reader 2501 contains illuminator/sensor assemblies 2551 and 2553. The illuminator/sensor assembly 2551 contains a flash illuminator 2555, a lens system 2557 and a photodetector array 2559. The illuminator/sensor assembly 2551 contains a conventional, unitary laser diode and photodetector scanning system 2561 (often referred to in the code reading industry as a "scanning engine").

The assemblies 2551 and 2553 operate independently in preferential order. Thus, the code reader 2501 can be configured to accept a plurality of combined illuminator/sensor assemblies which either independently utilize or share code reader resources such as the DSP 2505 during the code reading process.

Figure 25:
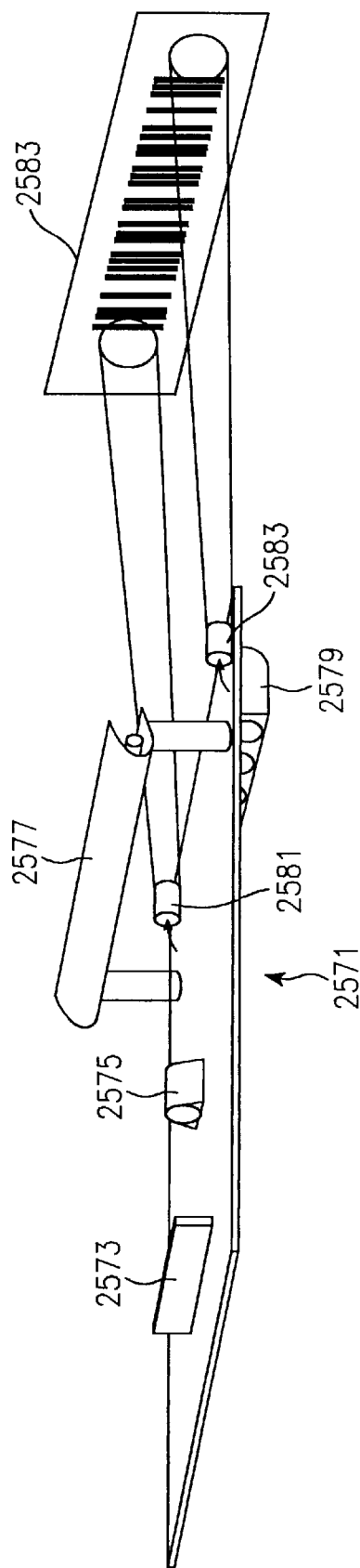
FIG. 25 is a perspective diagram which illustrates another aspect of the present invention relating to illuminator selection based on focal distance.

FIG. 25 is a perspective diagram which illustrates another aspect of the present invention relating to illuminator selection based on focal distance. In particular, a circuit board 2571 comprises a photodetector array 2573, lens assembly 2575, flash illuminator 2577, photodiode array 2579, and marker beam emitting diodes 2579 and 2581. To read a code 2583, the diodes 2579 and 2581 are activated. The diodes 2579 and 2581 emit two marker beams which, as previously discussed, provide the code reader an indication of the proximity of the code 2583.

If the marker beams indicate that the code 2583 is at a short range reading distance away from the photodetector array 2573, the photodiode array 2579 activates to illuminate the code 2583. Otherwise, when the reading distance is determined from the marker beams to be a longer distance away, the flash illuminator 2577 is used. In this way, sufficient illumination can be achieved while conserving power.

In the present embodiment, should the code reader using the initially designated illuminator fail to capture a valid read, a read attempt using the other illuminator is attempted as a backup strategy.

Although the dual-marker beam technique for determining proximity (distance) is preferred, other well known techniques might be easily substituted. Similarly, other or additional illuminators might be added or substituted, with each illuminator having a designated range in which it will initially be responsible to perform initial illumination efforts.

In an alternate embodiment of the circuit shown in FIG. 25, the photodetector array 2573 is used to determine ambient lighting levels. If ambient lighting is determined to be sufficient, no illuminator is used in the first attempt to read the code 2583. If the read attempt fails, a second attempt using the photodiode array 2579 is undertaken. If the second attempt fails, the flashable illuminator 2577 is implemented in a third attempt.

Alternately, if ambient lighting is determined to be at a level too low to justify a read attempt without illumination assistance, an illuminator is employed to assist even the first read attempt. Particularly, under typical ambient lighting, a first attempt utilizes the photodiode array 2579, followed by the flash illuminator 2577 whenever the first attempt fails. In very low ambient lighting conditions, the first read attempt employs the flashable illuminator 2577 without ever utilizing the photodiode array 2579. Thus, in this embodiment, the illuminator is properly selected to best accommodate lighting levels.

In addition, in some configurations such as is shown in FIG. 24c, alternate lens systems are employed. By changing the focal range of such lens systems, the use of the a given illuminator and lens system combination provides further benefits when limiting each illuminator to a given range. As is appreciated from the above descriptions, the present invention contemplates the use of several different types of illuminators, such as laser diodes, light emitting diodes, xenon flash tubes, etc., and different types of illuminator assemblies, each including one or more illuminators.

Moreover, it will be apparent that many modifications and variations may be effected without departing from the teachings and concepts of the present disclosure.

We claim:

1. A method for reading optical indicia on a target surface using a code reader, said method comprising the steps of:

selecting a first type of illuminator to conduct at least one read attempt by illuminating the optical indicia, and decoding said signals from at least one detector; and selecting a second type of illuminator to illuminate the optical indicia and decoding said signals from at least one detector to conduct at least one subsequent read attempt if the read attempt by means of said first type of illuminator is unsuccessful.

2. The method of claim 1, wherein said first and second types of illuminators utilize different illumination technologies.

3. The method of claim 1, wherein a processor first selects said second type of illuminator to conduct at least one read attempt and then selects said first type of illuminator to conduct at least one subsequent rad attempt if said processor determines via preference calculations that said second type of illuminator is more likely to result in a successful read attempt.

4. The method of claim 1, wherein a processor is coupled to said first and second types of illuminators and to said at least one detector.

5. The method of claim 1, wherein one additional detector receives light originating at one of said first type of illuminator or said second type of illuminator.

6. The method of claim 1, wherein said first and second types of illuminators are mounted on a single circuit board assembly which can be removed and replaced with other single circuit board assemblies having other types and combinations of illuminators mounted thereon.

7. The method of claim 1, wherein said detector comprises a photodetector array.

8. A method for reading optical indicia on a target surface using a code readery said method comprising the steps of:

determining whether the distance of the optical indicia from the code reader is within a first range or within a second range; and selecting a first type of illuminator to illuminate the optical indicia located within a first range and decoding said signals from at least one detector to conduct read attempts for optical indicia located within the first range; and selecting said second type of illuminator to illuminate the optical indicia located within a second range and decoding said signals from the at least one detector to conduct read attempts for optical indicia located within the second range.

9. The method of claim 8, wherein the first and second types of illuminators utilize different illumination technologies.

10. The method of claim 8, wherein either one of the first and second ranges is determined using at least one marker beam originating from either said first or second illuminator.

11. The method of claim 8, wherein either one of the first and second ranges is determined using a proximity detection performed by a processor based on reflected light received by said at least one detector.

12. The method of claim 8, wherein a processor is coupled to said first and second types of illuminators and to said at least one detector.

13. The method of claim 8, wherein said detector receives light reflected by optical indicia located within either one of the first and second ranges and originating from either one of said first and second types of illuminators, and provides signals indicative thereof.

14. The method of claim 8, wherein said at least one detector comprises a two-dimensional photodetector array.

15. The method of claim 8, wherein said first and second types of illuminators are mounted on a single circuit board assembly which can be removed and replaced with other single circuit board assemblies having other types and combinations of illuminators mounted thereon.

16. A method for reading optical indicia on a target surface using a code reader, said method comprising the steps of:

selecting one of a first type of illuminator that simultaneously illuminates the entire optical indicia to enable reading the optical indicia, or a second type of illuminator that illuminates the optical indicia over time while scanning the optical indicia to enable reading the optical indicia; and receiving light reflected by the optical indicia and originating from either one of said first and second types of illuminators by means of at least one detector; and processing signals from said at least one detector.

17. The method of claim 16, wherein said detector further comprises:

a first type of detector for receiving light originating at said first type of illuminator; and a second type of detector for receiving light originating at said second type of illuminator.

\* \* \* \* \*